United States Patent
Liberg et al.

(10) Patent No.: US 12,401,415 B2
(45) Date of Patent: Aug. 26, 2025

(54) POWER EFFICIENT NON-TERRESTRIAL NETWORK CONNECTION ESTABLISHMENT

(71) Applicant: Telefonaktiebolaget LM Ericsson (PUBL), Stockholm (SE)

(72) Inventors: Olof Liberg, Enskede (SE); Sebastian Euler, Storvreta (SE); Helka-Liina Määttänen, Helsinki (FI); Stefan Eriksson Löwenmark, Färentuna (SE); Talha Khan, Santa Clara, CA (US); Magnus Åström, Lund (SE); Emre Yavuz, Stockholm (SE); Jonas Sedin, Sollentuna (SE); Björn Hofström, Linköping (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 421 days.

(21) Appl. No.: 17/792,325

(22) PCT Filed: Feb. 2, 2021

(86) PCT No.: PCT/IB2021/050842
§ 371 (c)(1),
(2) Date: Jul. 12, 2022

(87) PCT Pub. No.: WO2021/156749
PCT Pub. Date: Aug. 12, 2021

(65) Prior Publication Data
US 2023/0055988 A1    Feb. 23, 2023

Related U.S. Application Data

(60) Provisional application No. 62/969,196, filed on Feb. 3, 2020.

(51) Int. Cl.
*H04B 7/185* (2006.01)
*H04W 76/19* (2018.01)
*H04W 84/06* (2009.01)

(52) U.S. Cl.
CPC ........ *H04B 7/18519* (2013.01); *H04W 76/19* (2018.02); *H04W 84/06* (2013.01)

(58) Field of Classification Search
CPC ............ H04B 7/18519; H04B 7/18513; H04B 7/18541; H04B 7/18523; H04B 7/2041;
(Continued)

(56) References Cited

U.S. PATENT DOCUMENTS

2017/0105153 A1\*   4/2017   Ashrafi ................ H04B 17/336

FOREIGN PATENT DOCUMENTS

| KR | 101581653 B1 | * 12/2015 |
| WO | 2017 023576 A1 | 2/2017 |
| WO | 2017 189862 A1 | 11/2017 |

OTHER PUBLICATIONS

3GPP TR 38.811 v15.2.0; Technical Report; 3rd Generation Partnership Project; Technical Specification Group Radio Access Network; Study on New Radio (NR) to support non-terrestrial networks (Release 15)—Sep. 2019.
(Continued)

*Primary Examiner* — Keith Ferguson

(57) ABSTRACT

A method (1200) performed by a wireless device (110) includes obtaining a remaining service time ($T_{service}$) associated with a first satellite or first spot beam. Based on the remaining service time, the wireless device determines whether to initiate a connection with the first satellite or first spot beam.

15 Claims, 14 Drawing Sheets

(58) Field of Classification Search
CPC .... H04B 7/0695; H04W 76/19; H04W 84/06; H04W 36/0085; H04W 56/001
See application file for complete search history.

(56) References Cited

OTHER PUBLICATIONS

3GPP TR 38.821 v16.0.0; Technical Report; 3rd Generation Partnership Project; Technical Specification Group Radio Access Network; Solutions for NR to support non-terrestrial networks (NTN) (Release 16)—Dec. 2019.
Xingqin Lin et al., 5G New Radio Evolution Meets Satellite Communications: Opportunities, Challenges, and Solutions—Mar. 27, 2019.
3GPP TSG RAN meeting #86; Sitges, Spain; Source: Thales; Title: Solutions for NR to support non-terrestrial networks (NTN) (RP-193234)—Dec. 9-13, 2019.
3GPP TSG RAN Meeting #86; Sitges, Spain; Source: MediaTek Inc.; Title: New Study WID on NB-IOT/ETMC support for NTN (RP-193235)—Dec. 9-31, 2019.
PCT Notification of Transmittal of the International Search Report and the Written Opinion of the International Searching Authority, or the Declaration issued for International application No. PCT/IB2021/050842—May 21, 2021.

* cited by examiner

POWER EFFICIENT NON-TERRESTRIAL NETWORK CONNECTION ESTABLISHMENT

PRIORITY

This nonprovisional application is a U.S. National Stage Filing under 35 U.S.C. § 371 of International Patent Application Serial No. PCT/IB2021/050842 filed Feb. 2, 2021 and entitled "POWER EFFICIENT NON-TERRESTERIAL NETWORK CONNECTION ESTABLISHMENT" which claims priority to U.S. Provisional Patent Application No. 62/969,196 filed Feb. 3, 2020 both of which are hereby incorporated by reference in their entirety.

TECHNICAL FIELD

The present disclosure relates, in general, to wireless communications and, more particularly, systems and methods for power efficient Non-Terrestrial Network (NTN) connection establishment.

BACKGROUND

In $3^{rd}$ Generation Partnership Project (3GPP) Release 8, the Evolved Packet System (EPS) was specified. EPS is based on the Long-Term Evolution (LTE) radio network and the Evolved Packet Core (EPC). It was originally intended to provide voice and mobile broadband (MBB) services but has continuously evolved to broaden its functionality. Since Release 13 Narrowband-Internet of Things (NB-IoT) and Long-Term Evolution for Machines (LTE-M) are part of the LTE specifications and provide connectivity to massive machine type communications (mMTC) services.

In 3GPP Release 15, the first release of the 5th Generation System (5GS) was specified. This is a new generation's radio access technology intended to serve use cases such as enhanced mobile broadband (eMBB), ultra-reliable and low latency communication (URLLC) and mMTC. $5^{th}$ Generation (5G) includes the New Radio (NR) access stratum interface and the 5G Core Network (5GC). The NR physical and higher layers are reusing parts of the LTE specification, and to that add needed components when motivated by new use cases. One such component is the introduction of a sophisticated framework for beam forming and beam management to extend the support of the 3GPP technologies to a frequency range going beyond 6 GHz.

In Release 15, 3GPP started the work to prepare NR for operation in a Non-Terrestrial Network (NTN). NTNs refer to networks, or segments of networks, using an airborne or spaceborne vehicle for transmission. Airborne vehicles refer to High Altitude Platforms (HAPs) encompassing Unmanned Aircraft Systems (UAS)—including tethered UAS, Lighter than Air UAS and Heavier than Air UAS—all operating at altitude; typically between 8 and 50 km, quasi-stationary. The work was performed within the study item "NR to support Non-Terrestrial Networks" and resulted in 3GPP TR 38.811 v. 15.4.0. In Release 16, the work to prepare NR for operation in an NTN network continued with the study item "Solutions for NR to support Non-Terrestrial Network" and is related to 3GPP TR 38.321 v. 16.0.0. In parallel the interest to adapt NB-IoT and LTE-M for operation in NTN is growing. As a consequence, 3GPP Release 17 contains both a work item on NR NTN (RP-193234, Solutions for NR to support non-terrestrial networks (NTN), 3GPP RAN #86) and a study item on NB-IoT and LTE-M support for NTN (RP-193235, Study on NB-Io/eMTC support for Non-Terrestrial Network, 3GPP RAN #86).

Satellite Communications

A satellite radio access network usually includes the following components:
  A satellite that refers to a space-borne platform.
  An earth-based gateway that connects the satellite to a base station or a core network, depending on the choice of architecture.
  Feeder link that refers to the link between a gateway and a satellite
  Access link that refers to the link between a satellite and a user equipment (UE).
  Depending on the orbit altitude, a satellite may be categorized as low earth orbit (LEO), medium earth orbit (MEO), or geostationary earth orbit (GEO) satellite:
    LEO: typical heights ranging from 250-1,500 km, with orbital periods ranging from 90-120 minutes.
    MEO: typical heights ranging from 5,000-25,000 km, with orbital periods ranging from 3-15 hours.
    GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth-fixed with some beam pointing mechanism used by the satellite to compensate for its motion. The size of a spotbeam depends on the system design, which may range from tens of kilometers to a few thousands of kilometers.

FIG. 1 illustrates an example architecture of a satellite network with bent pipe transponders. The depicted elevation angle of the service link is important as it determines the distance between the satellite and the device, and the velocity of the satellite relative the device. In 3GPP it has been assumed that the service link is operational for elevation angles exceeding a threshold of 10 degrees. Different locations within a cell will observe different elevation angles at a given time. From the network perspective the elevation angle is often referred to relative a reference point such as the spot beam center.

In an earth-fixed beam LEO or MEO NTN providing continuous coverage, a UE will be served by the same beam as long as the UE is in the coverage area of the satellite. Handover to a new satellite fulfilling the elevation angle threshold needs to be performed when the elevation angle to the currently serving satellite approaches the elevation angle threshold. The handover rate may be frequent. It has been shown that an inter-satellite handover may be required every 450 seconds for a LEO constellation at 600 km altitude. (See, X. Lin et al. "5G New Radio Evolution Meets Satellite Communications: Opportunities, Challenges, and Solution," arXiv preprint arXiv:1903.11219, March 2019. Available at https://arxiv.org/pdf/1903.11219). For LEO or MEO constellations using earth moving beams the UE will be served by the beam that currently passes the UE location. The UE will sequentially be served by a series of beams of the same satellite as the coverage area of the satellite passes the UE. After that, the UE will be served by a series of beams of a different satellite, etc. Thus, switching between satellite beams is even more frequent. Previous discussions have shown that for a LEO constellation at 600 km altitude based on earth moving beams a handover between spotbeams may be required every 10 seconds. (See id.)

Unlike the situation in terrestrial networks, the service link in NTN is typically line-of-sight (LoS) and therefore the pathloss is mainly dependent on the satellite-UE distance. Due to the geometry, the pathloss does not differ dramatically between the different beams of a satellite. For example, a pathloss range in the order of 10 dB can be expected within the coverage area of a LEO satellite at 600 km altitude. The spotbeam selectivity is mainly due to the directivity of the antenna lobes. The antenna lobes are approximately symmetric around each beam's center point on earth. It may therefore be feasible that cell selection/reselection is based on which spotbeam center that is closest to the UE. The UE can calculate its distance to each beam center and perform distance-based cell selection/reselection using information of ephemeris and beam constellation of nearby NTN satellites together with UE location.

Mobile Terminated and Mobile Originated Access

In a cellular network, mobile terminated (MT) access refers to the paging procedure where the network initiates a connection to a UE. Mobile originated (MO) access refers to the case where a UE initiates the access. In the first case, a page triggers the UE to initialize a connection establishment. In the second case, the UE autonomously initiates this procedure.

The random access (RA) procedure is the initial step in the process to establish a connection in a cellular network and is the first part of the connection establishment procedure. Together these procedures are used for achieving uplink (UL) time synchronization, performing contention resolution, and establishing a secure connection to a network.

In the first step of the RA procedure, a device transmits a Physical Random Access Channel (PRACH) preamble. In NR and LTE, a single preamble time-frequency format is configured per cell. In NB-IoT and LTE-M the preamble format is dependent on the coverage conditions of the device initiating the RA procedure. NB-IoT supports three coverage levels, also known as coverage enhancement (CE) levels. LTE-M supports four CE levels. For each coverage level a longer time format of the preamble is configured for improving the supported coverage of the preamble.

NB-IoT and LTE-M actually adapt the transmission format of all the physical channels for improving coverage during the random access and connection establishment procedures. The general mechanism for improving the coverage is to prolong the transmission times. This implies that the time required to establish a connection is increasing with worsened coverage conditions. A similar, although less pronounced, relation exists for NR since the radio link becomes more error prone as the coverage becomes more challenging.

Certain problems exist. For example, the temporary nature of the coverage of a satellite is not considered when accessing a cell. 3GPP assumes that the service link is operational for an elevation angle exceeding a certain threshold, e.g. 10 degrees. 3GPP has however not considered whether the elevation angle is increasing or decreasing due to the satellite moving towards or away from the device. If the elevation angle is just above the threshold and decreasing, this means that the service link may only be operational for a very limited time, due to the high velocity of the serving non-geostationary satellite.

For earth moving beams, the beams are "non-steerable" which means a grid of beams sweep the earth and that the coverage area of a beam leaves the geographical location of a non-moving UE at a speed determined by the satellite velocity and the beam size. A beam switch may occur after just a handful of seconds.

In such scenarios, it may not be efficient to initiate a mobile originated or terminated connection attempt, if the link will soon be interrupted, or handed over to a new satellite or spotbeam, before the connection can be established.

SUMMARY

Certain aspects of the present disclosure and their embodiments may provide solutions to these or other challenges. For example, according to certain embodiments, a method for improving the random access and connection establishment procedures in New Radio (NR) for Non-Terrestrial Network (NTN) and Narrowband-Internet of Things (NB-IoT) and Long Term Evolution for Machines (LTE-M) for NTN is provided. Specifically, for example, a method is provided for determining if its efficient to select a NTN cell, or to initiate a Mobile Terminated (MT) or Mobile Originated (MO) connection in a NTN cell before the service link associated to a serving satellite and spotbeam, is handed over to a new satellite, or a new spotbeam.

Certain embodiments may provide one or more of the following technical advantages. For example, one technical advantage may be that certain embodiments ensure that a connection establishment is performed in a cell that is expected to support the full Radio Resource Control (RRC) connection establishment, and hopefully even the full RRC connection before a handover to a new satellite and/or spotbeam is triggered. This limits the number of wasteful connection establishment attempts in a NTN and improves the device power efficiency.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
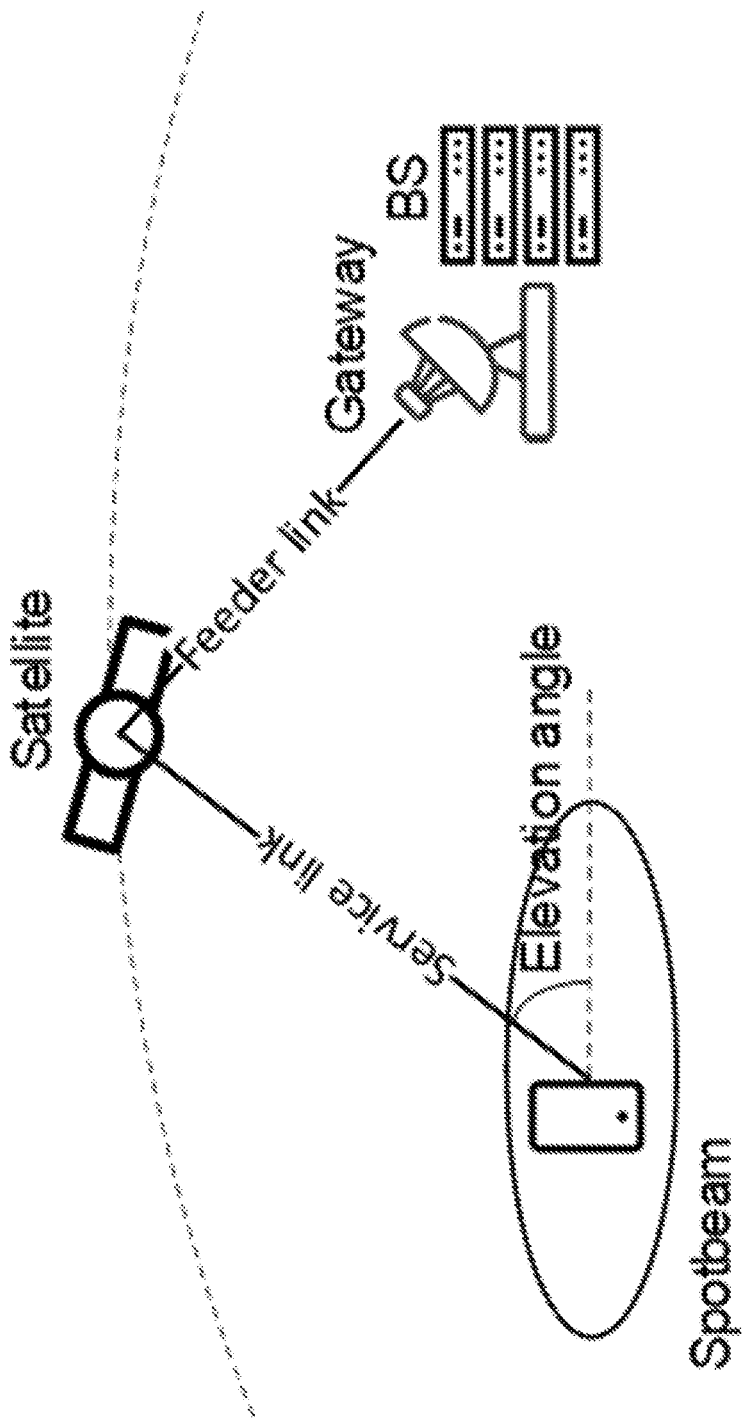
FIG. 1 illustrates an example architecture of a satellite network with bent pipe transponders.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. Mobile Switching Center (MSC), Mobility Management Entity (MME), etc), Operations & Maintenance (O&M), Operations Support System (OSS), Self Optimized Network (SON), positioning node (e.g. Evolved-Serving Mobile Location Centre (E-SMLC)), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNodeB (gNB), or UE.

According to certain embodiments, a method for improving the random access and connection establishment procedures in New Radio (NR) for Non-Terrestrial Network (NTN) and Narrowband-Internet of Things (NB-IoT) and Long Term Evolution for Machines (LTE-M) for NTN is provided. Specifically, for example, a method is provided for determining if its efficient to select a NTN cell, or to initiate a Mobile Terminated (MT) or Mobile Originated (MO) connection in a NTN cell before the service link associated to a serving satellite and spotbeam, is handed over to a new satellite, or a new spotbeam.

According to certain embodiments, a set of rules is proposed for determining if it is power and spectrally efficient to initiate a mobile originated or terminated connection access attempt in a non-geostationary NTN, based e.g. on LEO satellites, or if the UE or network should wait for a service link switch to a new satellite, or a new spotbeam, before triggering the access attempt.

Condition for MO or MT Access Triggering

According to certain embodiments, the remaining time, $T_{service}$, until the service link is switched to a different satellite, or a different spot beam, is defined. Alternatively, in other embodiments, $T_{service}$ may correspond to the time until the serving satellite constellation, or spot beam, goes out of coverage. Alternatively, in other embodiments, $T_{service}$ corresponds to the time until the elevation angle to the serving satellite goes below a threshold defining the suitability of a cell.

In a particular embodiment, $T_{service}$ is used for determining if the random access procedure should be triggered using the candidate satellite.

In a particular embodiment, the time $T_{access}$ is estimated as the time required to initiate a MT or MO connection including paging, random access, the RRC connection establishment or Early Data Transmission (EDT) procedures, and/or the time to complete an RRC connection.

In a particular embodiment, $T_{access}$ is compared to $T_{service}$ for determining if the random access procedure should be triggered using the candidate satellite.

In one example embodiment, a device considers it feasible to initiate and/or complete a connection using the candidate satellite if $T_{service} \geq T_{access}$. If $T_{service} < T_{access}$ then the UE or NW should wait to perform the connection establishment attempt until a handover or a switch to a new satellite, or a new spot beam, has been performed for which $T_{service} \geq T_{access}$. In a sub-example, the condition $T_{service} > T_{access} + T_{offset}$ must be fulfilled for a connection attempt to be made, where $T_{offset}$ is a configured offset.

Methods for Determining $T_{service}$

According to certain embodiments, $T_{service}$ may be determined based on network signaling.

In a particular embodiment, for example, a satellite signals the time $T_{service}$ such as, for example, using broadcast signaling to all devices in a cell. In a particular embodiment, the satellite may signal the $T_{service}$ in a SI message or System Information Block Type IE.

In a particular embodiment, information relevant for resuming a connection to the same beam or cell such as, for example, the time $T_{service}$, may be signaled to the UE when the UE is sent from RRC connected mode to RRC inactive mode. For example, the $T_{service}$, may be included in a IE SuspendConfig signalled to the UE in RRCRelease message or to RRC idle mode with suspend.

In a particular embodiment, $T_{service}$ is provided along with the parameters provided for conditional handover so that the UE is able to make better decisions about cell selection during handover.

Note that $T_{service}$ is a time-varying parameter. While the network may frequently update and broadcast $T_{service}$, it is possible that an idle mode UE may have an outdated value of $T_{service}$ when it intends to perform random access. To address this, certain particular embodiments propose:

In a particular embodiment, an idle mode UE attempts to reacquire $T_{service}$ when it intends to perform random access.

In another particular embodiment, the network defines and broadcasts a 1-bit parameter in SI. The network may e.g. set this bit if $T_{service}$ is below typical or worst-case values of $T_{access}$. If it is set, then the UE should attempt to reacquire $T_{service}$ when it intends to perform random access. Otherwise, the UE may choose to reacquire $T_{service}$ when it intends to perform random access.

Methods Based on Elevation Angle

In a particular embodiment, the direction of motion of a candidate satellite relative to the device and the service link elevation angle are used as indicators of the mentioned time period $T_{service}$. If the satellite is moving towards the device, with an elevation angle exceeding a first threshold (e.g. 10 degrees) the satellite is considered eligible for random access. If the satellite is moving away from the device, with a decreasing elevation angle exceeding a first threshold the satellite is considered eligible for random access if the elevation angle also exceeds a second threshold (e.g. 30 degrees). The difference in the first and second elevation angle threshold should relate to the time $T_{access}$, so that the satellite provides an actual elevation angle of a value in the range defined by the first and second elevation angle threshold for at least $T_{access}$.

In a particular embodiment, $T_{service}$ is calculated as the time during which the satellite supports an elevation angle greater than a stipulated threshold such as, for example, 10 degrees. In another embodiment, $T_{service}$ is calculated as the time during which the satellite supports an elevation angle greater than any other satellite in the same NTN.

In a particular embodiment, the elevation angle used in the previous embodiments is defined relative to a reference location in the cell such as the cell center.

In another particular embodiment, $T_{service}$ is defined as the remaining time until the service link elevation angle for the serving satellite dips below the minimum required elevation angle threshold for at least X % of the cell coverage area. For example, when X=60%, $T_{service}$ is the time until the satellite elevation angle dips below the required threshold for at least 60% area of the cell.

For any embodiments related to the methods based on elevation angle, the elevation angle (where needed) may be calculated by the UE based on its own geographical position (e.g. from Global Navigation Satellite System (GNSS)) and current ephemeris data for the satellite. In another particular embodiment, the elevation angle is known by the UE through network signaling, e.g. broadcast. In yet another particular embodiment the elevation angle is measured by the UE.

Methods Based on Location

In a particular embodiment, the UE is aware of its own geographical position (e.g. from GNSS), and knows the current ephemeris data and beam constellation information for the serving satellite and near-by non-serving satellites. It is thus aware of the position and movement of all nearby beam centers and the time until a given beam center is closest to the UE. Using the position and movement of the satellites, the UE may calculate $T_{service}$ itself. In this case, $T_{service}$ does not need to be provided by the network. In a sub-embodiment, the UE calculates $T_{service}$ as the time during which the UE is closer to any spotbeam center than to any other spotbeam center.

In a particular embodiment, when the network is aware of the specific UE locations, it can use satellite trajectory information to calculate the UE-specific $T_{service}^i$ for a UE i (which itself is a function of time). Then, the cell-level parameter $T_{service}$ can be derived as a function of UE-specific values $\{T_{service}^i\}_i$ in the cell. For example, $T_{service}$ can be set to be the average of the set of UE-specific values $\{T_{service}^i\}_i$ observed in the cell.

In a particular embodiment, even if the network does not know the UE locations, $T_{service}$ can still be calculated like in the previous embodiment. If the statistical distribution of UE locations is known or can be assumed, $\{T_{service}^i\}_i$ and $T_{service}$ can be calculated. For example, UEs can be assumed to be randomly located within the cell following a uniform distribution.

Methods to Improve $T_{service}$ Accuracy

According to certain embodiments, the cell-level parameter $T_{service}$ attempts to approximate the UE-specific quantity $T_{service}^i$. The following particular embodiment attempts to reduce the difference between the actual $T_{service}^i$ of an idle mode UE and the $T_{service}$ it receives from the network.

In a particular embodiment, the network defines and broadcasts 2 parameters: $\{T_{service}^{hi}, T_{service}^{lo}\}$ where $T_{service}^{hi} > T_{service}^{lo}$. For example, $T_{service}^{hi}$ can be defined as the maximum time $$(\max_i \{T_{service}^i\}_i)$$

until the satellite elevation angle dips below the required threshold. Similarly, $T_{service}^{lo}$ can be defined as the minimum time $$(\min_i \{T_{service}^i\}_i)$$

until the satellite elevation angle dips below the required threshold. Note that the network need not know the exact UE locations. As discussed in 0, it can estimate $\{T_{service}^{hi},$ $T_{service}^{lo}$} by assuming an appropriate UE location distribution (e.g., uniform, Gaussian, etc.).

An idle mode UE can either use $T_{service}^{hi}$ or $T_{service}^{lo}$ possibly depending on some additional rules. For example, an idle mode UE can leverage other information to decide whether/when to use $T_{service}^{hi}$ or $T_{service}^{lo}$ when it decides whether to trigger random access. For example:

1. Signal strength: UE uses $T_{service}^{hi}$ by default. If the neighbor cell signal strength stays above a certain threshold for a certain time, the UE uses $T_{service}^{lo}$.
2. Doppler sign: UE uses $T_{service}^{hi}$ by default. If the tracked Doppler sign switches from positive to negative (i.e., the satellite moves away from the UE), the UE uses $T_{service}^{lo}$.
3. It is up to the UE to decide whether to use $T_{service}^{lo}$ or $T_{service}^{lo}$. For example, a battery-powered energy-constrained UE may decide to use $T_{service}^{lo}$ (to avoid a wasteful random access attempt) whereas a UE without such constraints may decide to be more aggressive and use $T_{service}^{hi}$.

Methods Based on Doppler Shift

In a particular embodiment, the UE measures the downlink Doppler shift difference between the service link of a serving satellite and the service link of at least one non-serving satellite. If the Doppler shift of a non-serving satellite is higher (i.e., more positive) than the Doppler shift of the serving satellite by a certain amount D, the UE selects the non-serving satellite before performing random access. If the accessing the non-serving satellite is not yet possible, e.g., because the received signal level is too low, the UE postpones the random access until the new satellite is accessible.

The aforementioned Doppler shift difference may be used in combination with other measurements for cell selection/reselection such as, for example, Reference Signal Received Power (RSRP).

The amount D may be configured by the UE through network signaling, e.g. broadcast, or can be up to implementation.

It may be noted that, if the Doppler shift of a non-serving satellite is larger (i.e., more positive) than the Doppler shift of the serving satellite, this indicates that the non-serving satellite is moving towards the UE at a higher rate than the serving satellite. If the Doppler shift difference is large, this indicates that the serving satellite is likely moving away from the UE while the non-serving satellite is moving towards the UE.

Any Other Methods

In a particular embodiment, $T_{service}$ is the time until a service link is switched for any other reason determined by the network operator.

In another particular embodiment, RSRP or Reference Signal Received Quality (RSRQ) of some reference signal is used to determine the remaining time until the service link is switched to a different satellite, or beam, based on broadcasted threshold values. This determination may allow the UE to determine if its suitable to initiate a connection in the beam, or if it should wait for a next beam.

Methods for Determining $T_{access}$ $T_{access}$ corresponds as already mentioned to the time required to initiate a MT or MO connection including paging, random access, the RRC connection establishment procedures, and/or the time to complete an RRC connection.

The time to complete a RRC connection includes the time needed for the anticipated traffic pattern to complete. The UE or NW may through implementation derive $T_{access}$ by using prediction or average time from past access attempts—this may be enabled by relative stationarity of the satellite link.

In a particular embodiment, if the UE is in connected mode and needs to perform random access due to being out-of-synch, the UE calculates $T_{access}$ as the time required to be in-sync again, i.e., update its TA value through the random access response in response to the random access preamble attempt and/or UL frequency pre-compensation value before transmitting in the UL.

In another particular embodiment, the condition of triggering random access in RRC state, i.e. the value used for $T_{access}$, might be configured to be different compared to the condition used for RRC idle or RRC inactive mode. This will allow for a more UE-specific differentiation, where UEs in RRC inactive mode can be allowed to perform random access later with respect to $T_{service}$ than UEs in RRC idle as for UEs in RRC inactive mode, the gNB has the UE context and even if signaling exchange over Uu-interface takes same amount of time, there is no gNB to core network signaling needed for the connection establishment.

Further differentiation when determining $T_{access}$ based on UE capabilities and coverage may be used. $T_{access}$ may e.g. determined based on the power class of the device. $T_{access}$ is increasing with decreasing transmission power.

In a particular embodiment, $T_{access}$ is determined based on the CE level of the device. $T_{access}$ is increasing with increasing CE level.

In a particular embodiment, each CE level N is associated with a timing threshold $T_{threshold,CE\_N}$ defining if random access is permitted from a given CE level. Random access is only permitted to be triggered from CE level N if $T_{service} > T_{threshold,CE\_N}$. $T_{threshold,CE\_N}$ may be signaled from the network to all devices in the cell by means of broadcast signaling.

In a particular embodiment, the network signals a N-bit bit map which indicates for each CE level if $T_{service} > T_{threshold,CE\_N}$. If bit k is set, e.g. to 1, then $T_{service} > T_{threshold,CE\_k}$, and random access is permitted from CE level k. If a bit k is not set, then random access is not permitted from CE level k.

In a particular embodiment, each CE level N is associated with an elevation angle threshold $\alpha_{threshold}$. Random access is only permitted to be triggered from CE level N if the UEs estimated elevation angle $\alpha_{ue} > \alpha_{threshold}$.

In the above embodiments, the $T_{access}$ is stated to per satellite. However, as one NR cell can have multiple SSB beams and how these NR cells and SSB beams are mapped to satellite beams is flexible, $T_{access}$ may thus be made satellite, cell or SSB beam specific. The value of $T_{access}$ may be set differently if the UE performs an access as part of a beam management procedure, a cell access or a handover between NR cells. For example, if UE is recovering from beam failure detection or radio failure detection the values for $T_{access}$ and corresponding thresholds (e.g. corresponding to $T_{service} + T_{offset}$) can be set differently compared to when a UE is recovering from beam failure, since the UE then still has an ongoing RRC connection and does not have to do more lengthy connection re-establishment or RRC connection resume.

In a particular embodiment, a time value is broadcasted that indicates how long time the network expects that the EDT procedure, including preamble, data transmission and release to idle mode, i.e., RRC_IDLE, will require assuming that RA is triggered for EDT with the expectation that no downlink (DL) data or only single shot DL data is expected as a response to MO traffic or only single shot DL data is expected due to MT traffic.

Cell Selection

In a particular embodiment, $T_{service}$ is used to determine cell suitability. A cell is suitable only if $T_{service}$ exceeds a threshold value.

In a particular embodiment, a CE level specific cell suitability requirement based on $T_{service}$ or on the elevation angle is defined. It is expected to reflect that a UE can tolerate a lower elevation angle if it's in good coverage conditions, but prefers to operate from a larger elevation angle when it's in challenging coverage conditions.

In a particular embodiment, the network broadcasts for each CE level a CE level specific elevation angle cell suitability requirement. A UE may only select to camp on a cell if its estimated elevation angle meets the CE level specific elevation angle threshold associated with the CE level of the UE.

In a particular embodiment, the UE bases the cell ranking used at cell reselection, on $T_{service}$ or on the direction of motion of a satellite supporting a cell. For example, a UE may down prioritize cells and satellites moving away from the UE.

Figure 2:
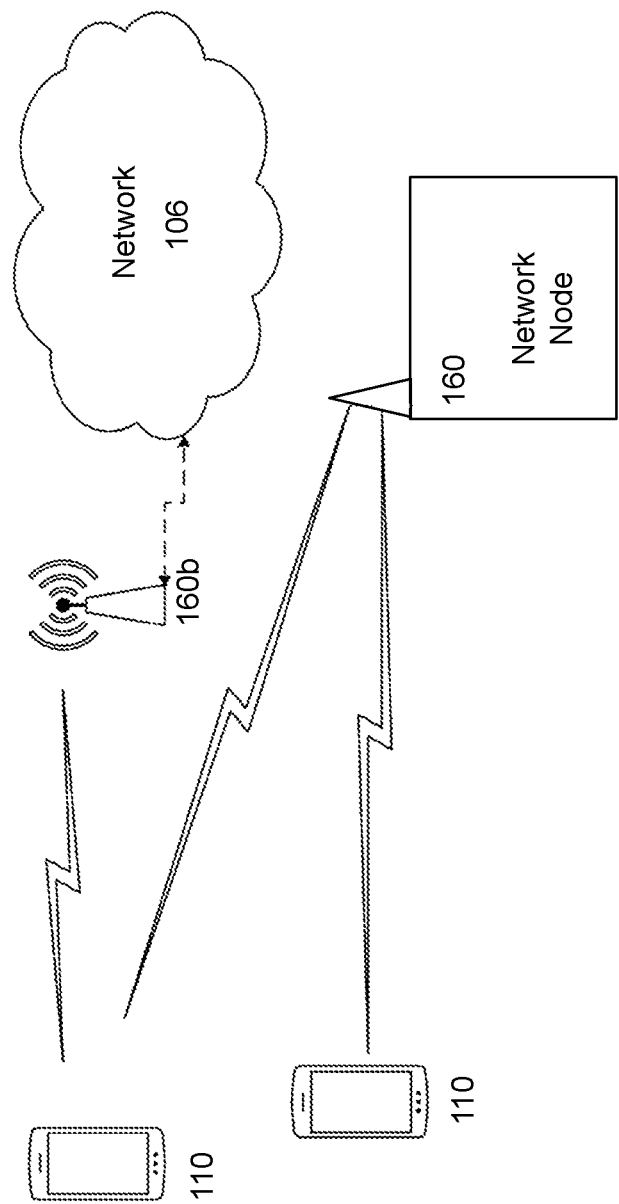
FIG. 2 illustrates an example wireless network, according to certain embodiments.

FIG. 2 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 3:
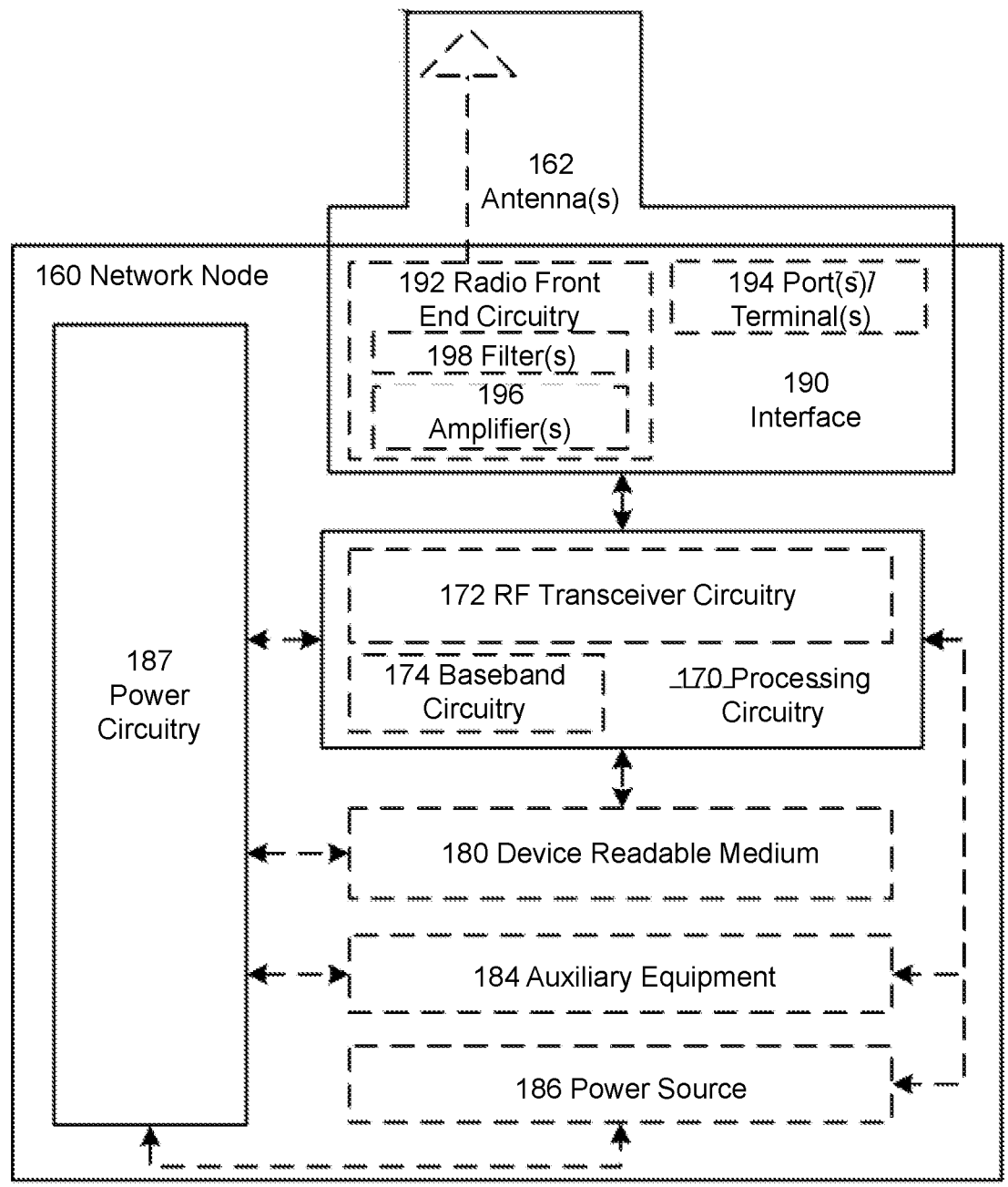
FIG. 3 illustrates an example network node, according to certain embodiments.

FIG. 3 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs)(e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile Communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 4:
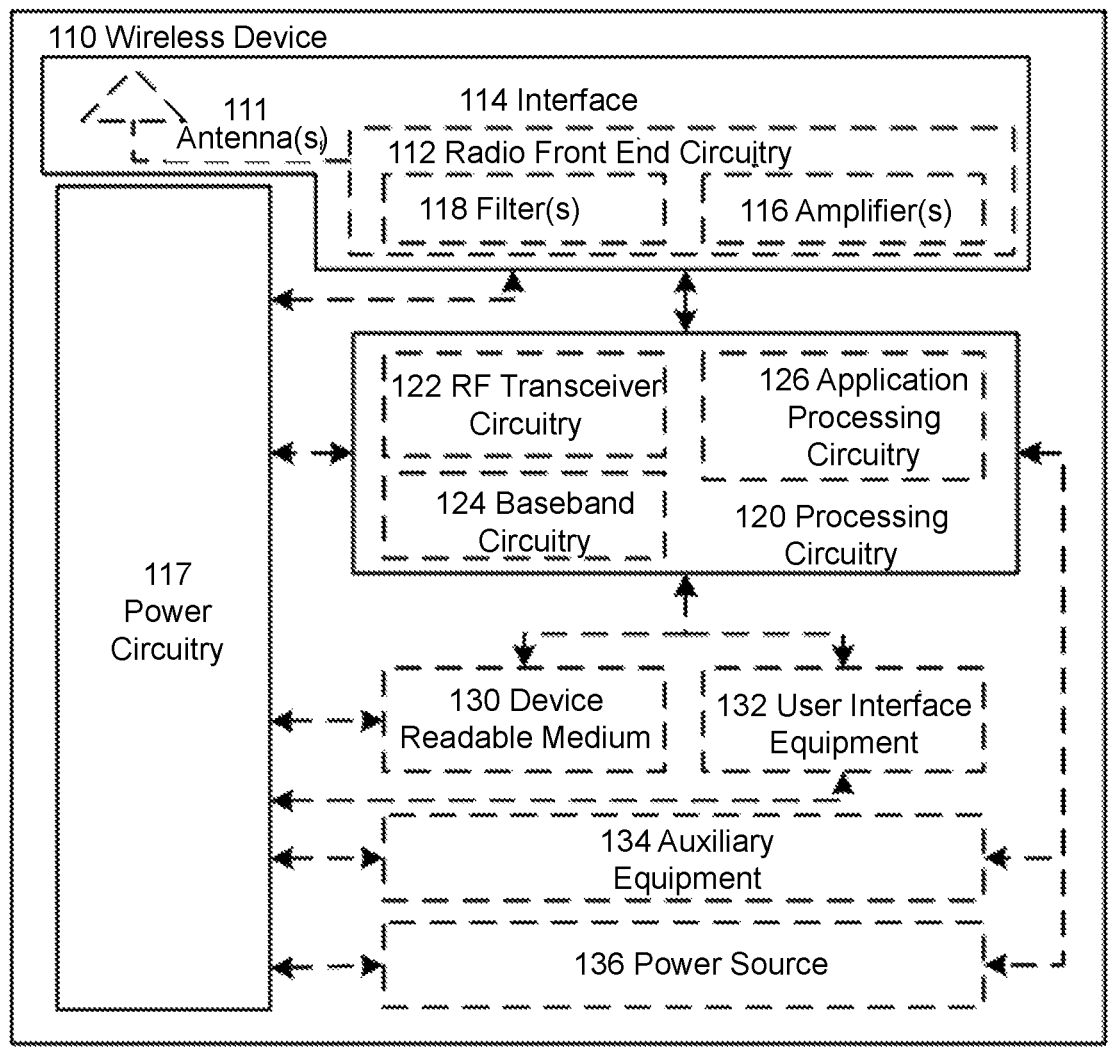
FIG. 4 illustrates an example wireless device, according to certain embodiments.

FIG. 4 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 5:
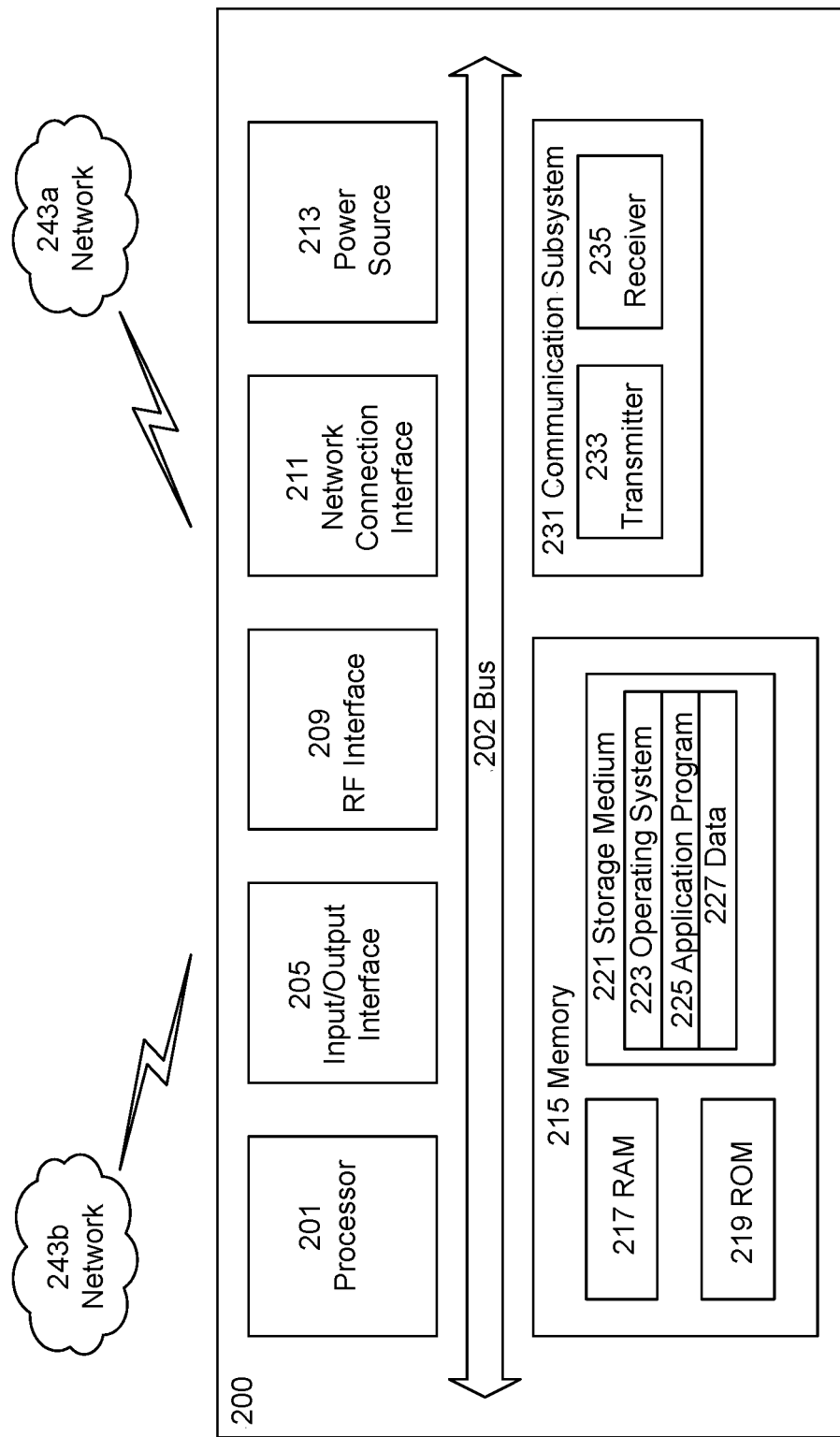
FIG. 5 illustrate an example user equipment, according to certain embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 3, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 5 is a UE, the components discussed herein are equally applicable to a wireless device, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
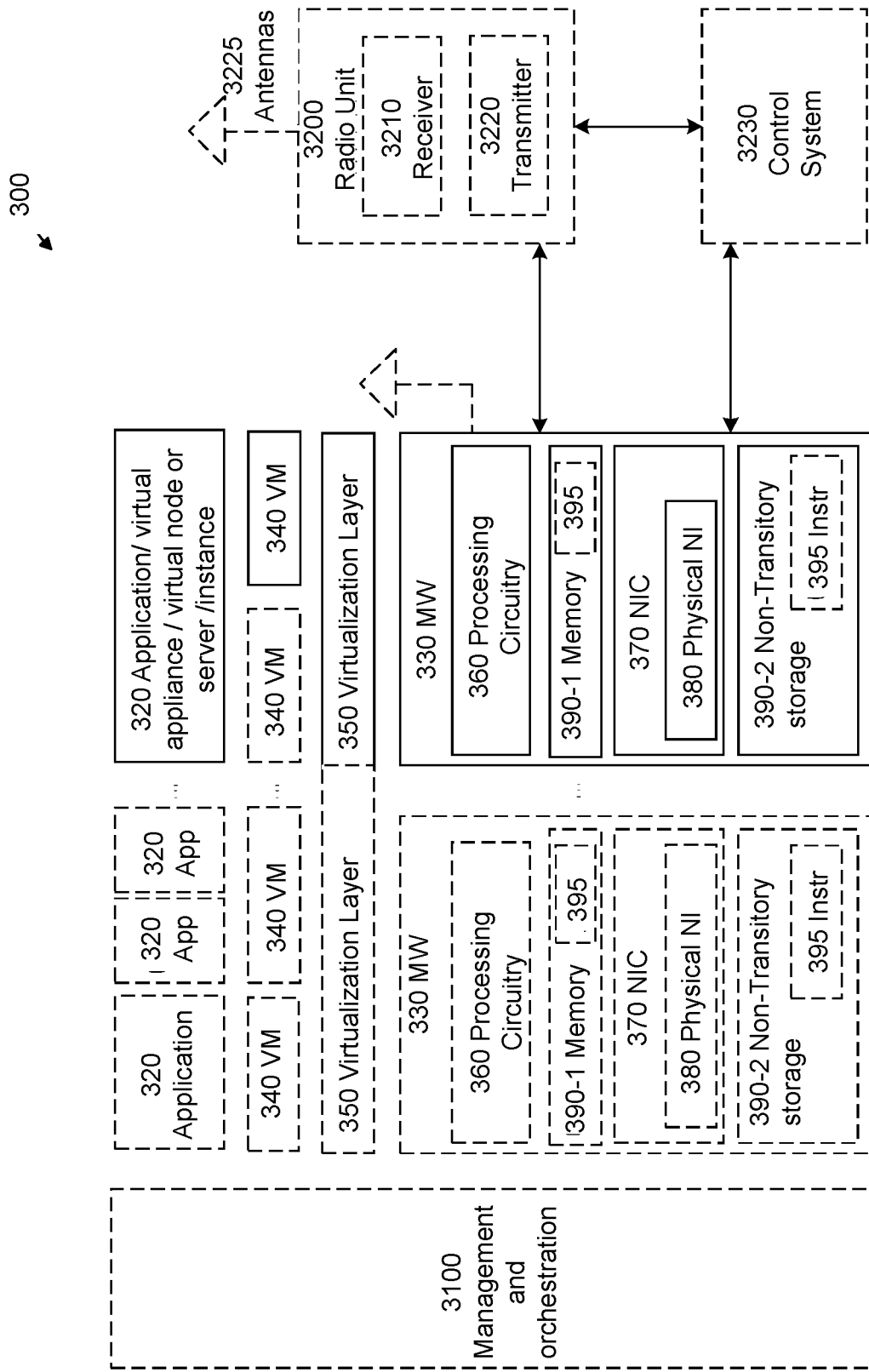
FIG. 6 illustrates a virtualization environment in which functions implemented by some embodiments may be virtualized, according to certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 6.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 7:
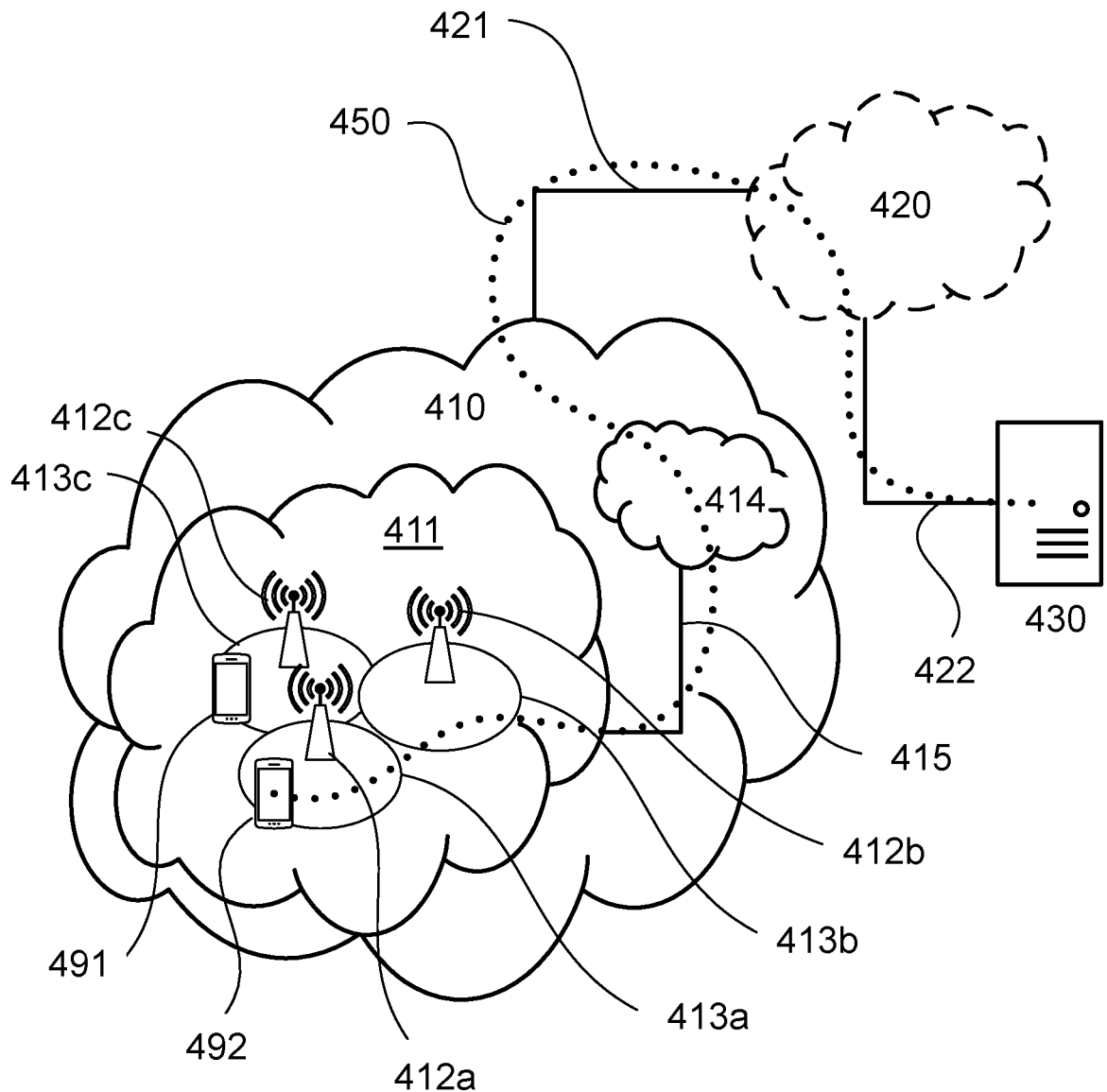
FIG. 7 illustrates a telecommunication network connected via an intermediate network to a host computer, according to certain embodiments.

FIG. 7 illustrates a telecommunication network connected via an intermediate network to a host computer in accordance with some embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of UL and DL communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing UL communication originating from the UE 491 towards the host computer 430.

Figure 8:
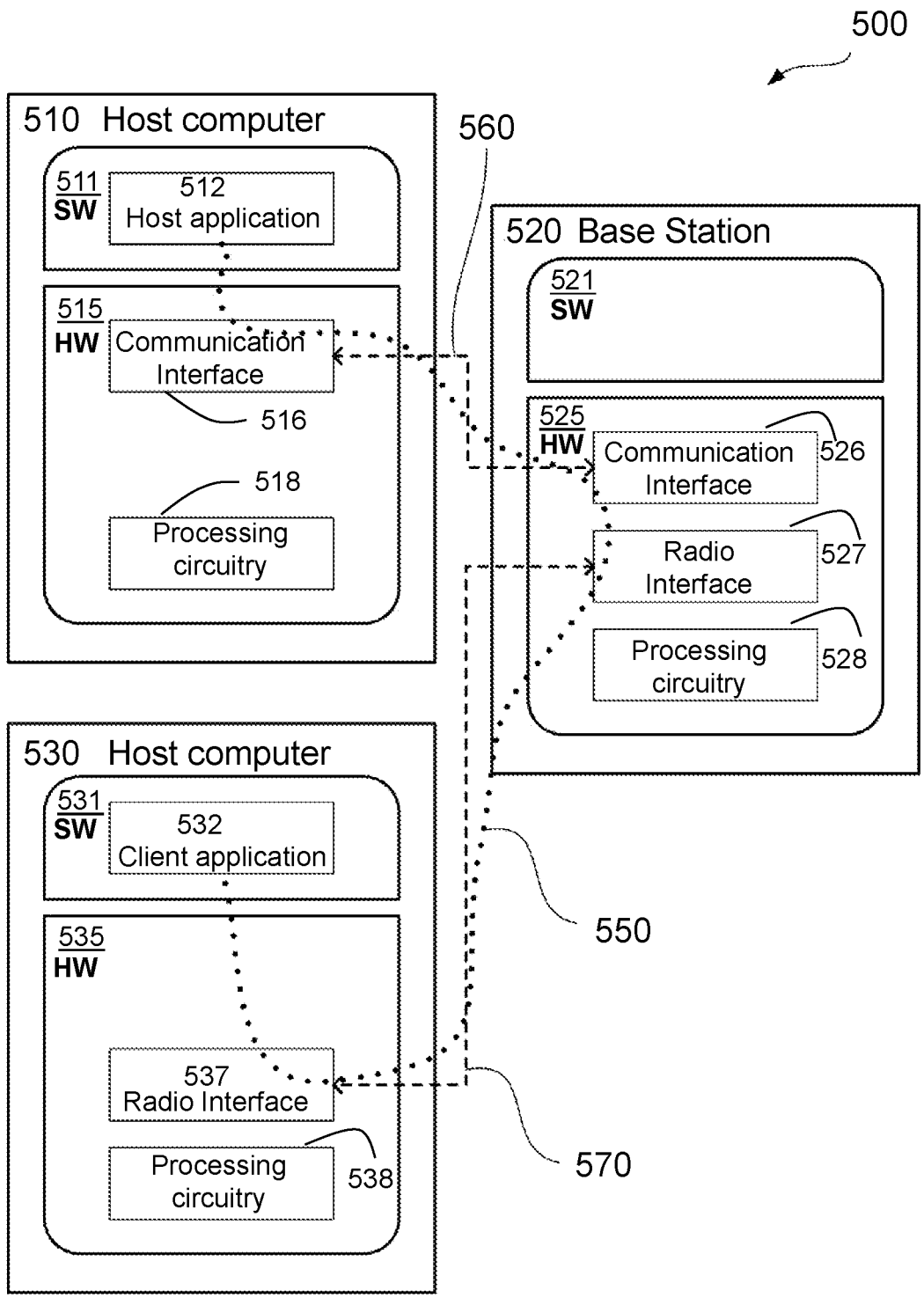
FIG. 8 illustrates a generalized block diagram of a host computer communicating via a base station with a user equipment over a partially wireless connection, according to certain embodiments.

FIG. 8 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 8 may be similar or identical to host computer 430, one of base stations 412a, 412b, 412c and one of UEs 491, 492 of FIG. 7, respectively. This is to say, the inner workings of these entities may be as shown in FIG. 8 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 9, 10:
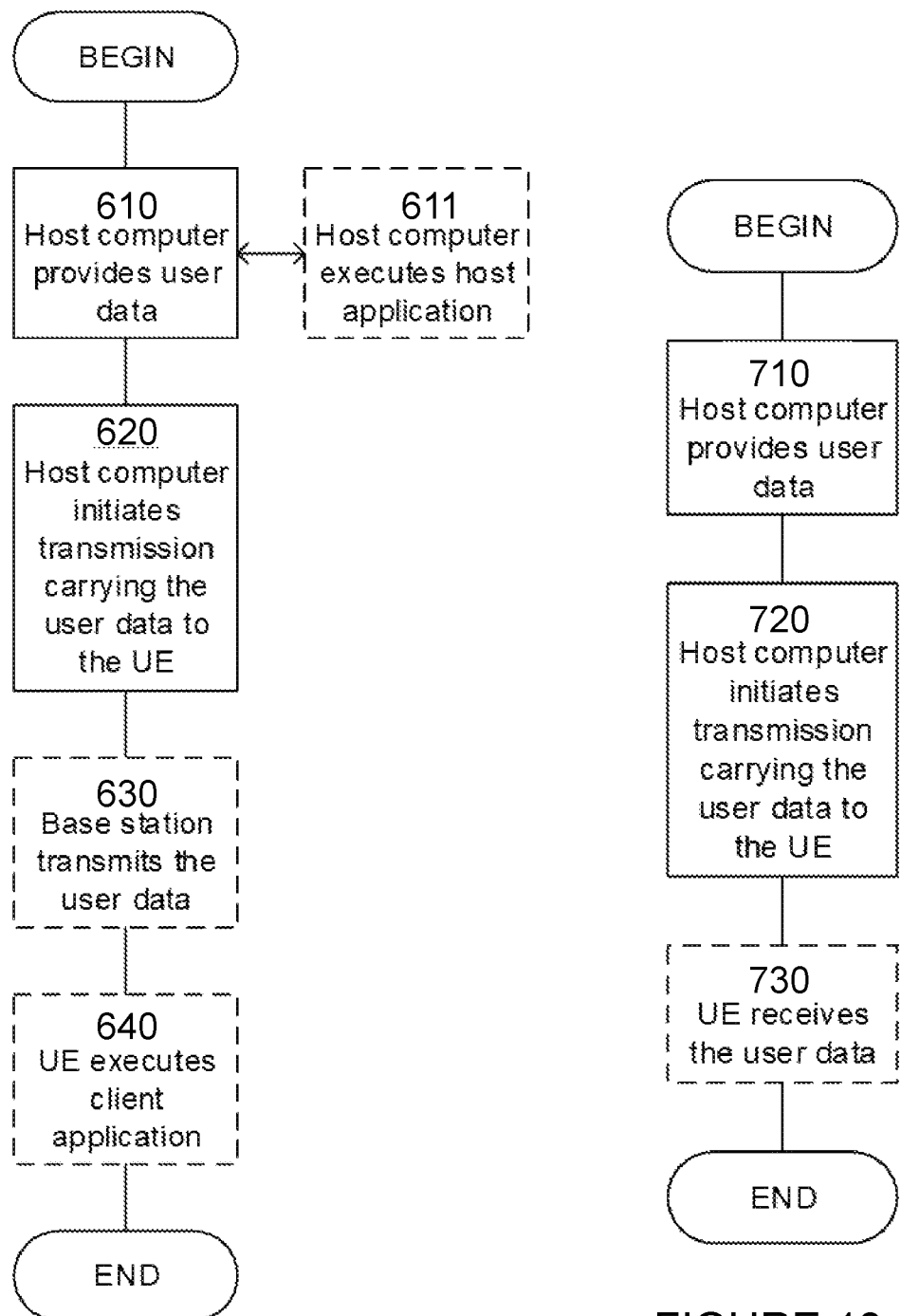
FIG. 9 illustrates a method implemented in a communication system, according to one embodiment.
FIG. 10 illustrates another method implemented in a communication system, according to one embodiment.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 11, 12:
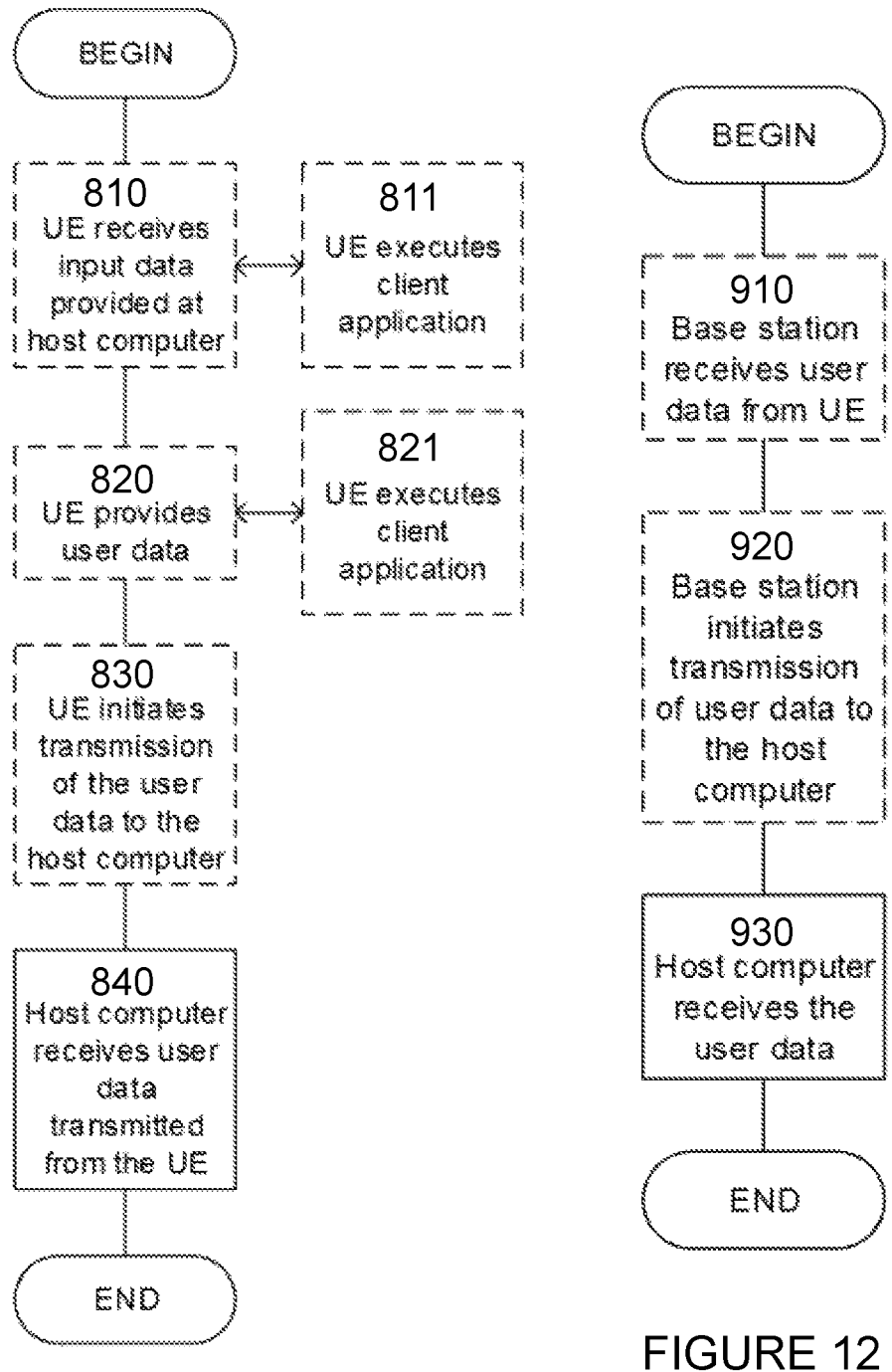
FIG. 11 illustrates another method implemented in a communication system, according to one embodiment.
FIG. 12 illustrates another method implemented in a communication system, according to one embodiment.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 13:
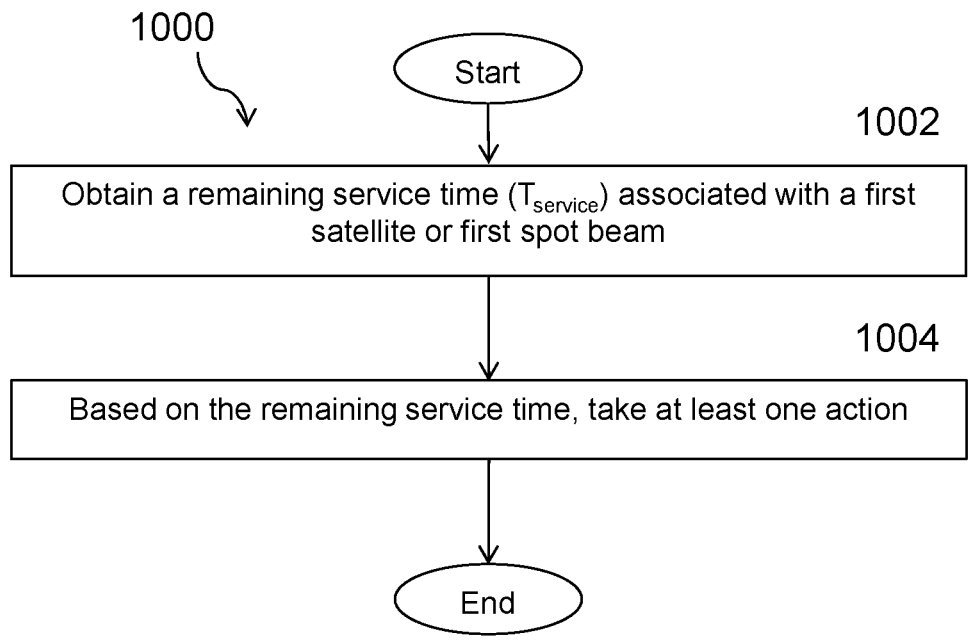
FIG. 13 illustrates an example method by a wireless device, according to certain embodiments.

FIG. 13 depicts a method 1000 performed by a wireless device 110, according to certain embodiments. At step 1002, the wireless device 110 obtains a remaining service time ($T_{service}$) associated with a first satellite or first spot beam. Based on the remaining service time, the wireless device 110 takes at least one action at step 1004.

Figure 14:
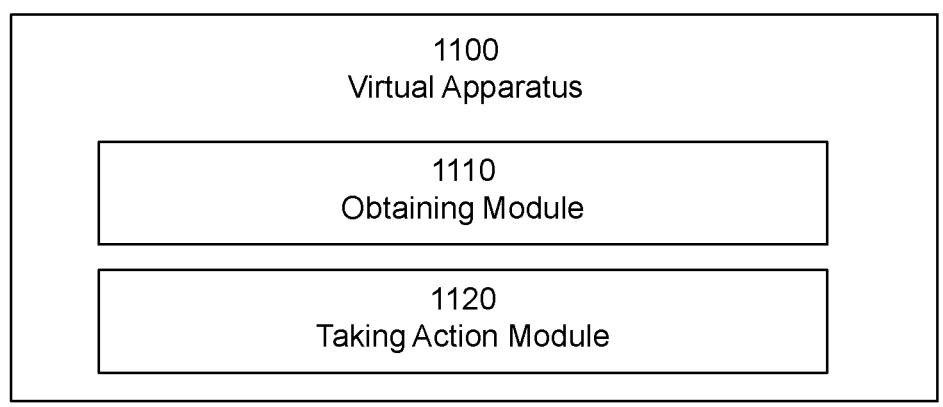
FIG. 14 illustrates an exemplary virtual computing device, according to certain embodiments.

FIG. 14 illustrates a schematic block diagram of a virtual apparatus 1100 in a wireless network (for example, the wireless network shown in FIG. 2). The apparatus may be implemented in a wireless device or network node (e.g., wireless device 110 or network node 160 shown in FIG. 2). Apparatus 1100 is operable to carry out the example method described with reference to FIG. 13 and possibly any other processes or methods disclosed herein. It is also to be understood that the method of FIG. 13 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1110, taking action module 1120, and any other suitable units of apparatus 1100 to perform corresponding functions according one or more embodiments of the present disclosure.

According to certain embodiments, obtaining module 1110 may perform certain of the obtaining functions of the apparatus 1100. For example, obtaining module 1110 may obtain a remaining service time ($T_{service}$) associated with a first satellite or first spot beam.

According to certain embodiments, taking action module 1120 may perform certain of the taking action functions of the apparatus 1100. For example, taking action module 1120 may take at least one action based on the remaining service time.

As used herein, the term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
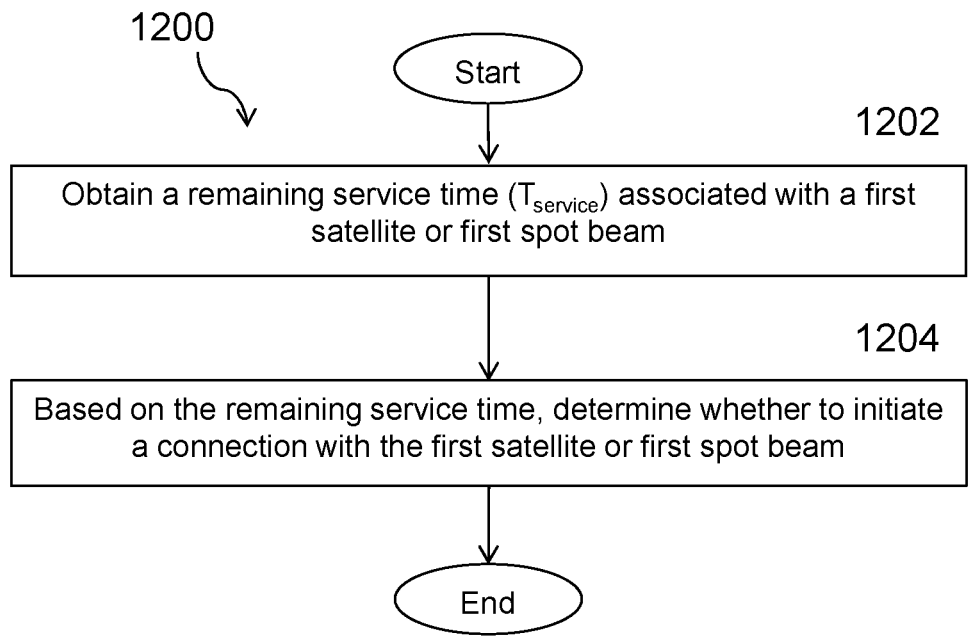
FIG. 15 illustrates another example method by a wireless device, according to certain embodiments.

FIG. 15 depicts another method 1200 performed by a wireless device 110, according to certain embodiments. It may be recognized that method 1200 provides a more specific example of method 1000 described above with regard to FIG. 13. At step 1202, the wireless device 110 obtains a remaining service time ($T_{service}$) associated with a first satellite or first spot beam. Based on the remaining service time, the wireless device determines whether to initiate a connection with the first satellite or first spot beam, at step 1204.

In a particular embodiment, the wireless device 110 determines whether the remaining service time is greater than or equal to a threshold.

In a particular embodiment, the remaining service time comprises an amount of time before a service link associated with the first satellite or first spot beam is switched to a second satellite or second spot beam.

In a particular embodiment, the remaining service time comprises an amount of time until the first satellite or first spot beam goes out of coverage.

In a particular embodiment, determining whether to initiate the connection with the first satellite or first spot beam comprises determining whether to initiate a random access procedure with the first satellite or first spot beam.

In a particular embodiment, the wireless device 110 determines a time to access ($T_{access}$) comprising an amount of time required to initiate the connection with the first satellite or the first spot beam. The wireless device determines that the remaining service time is greater than or equal to the time to access and, based on the remaining service time being greater than or equal to the time to access, initiates the connection with the first satellite or the first spot beam.

In a particular embodiment, obtaining the remaining service time comprises receiving the remaining service time from the first satellite.

In a particular embodiment, the remaining service time comprises an amount of time during which the first satellite supports an elevation angle greater than or equal to a threshold elevation angle.

In a further particular embodiment, when the first satellite is moving towards the wireless device, the threshold elevation angle is less than when the first satellite is moving away from the wireless device.

In a further particular embodiment, the threshold elevation angle comprises a minimum required elevation angle for at least a minimum percentage of a cell coverage area.

In a particular embodiment, the remaining service time comprises an amount of time during which the first satellite supports an elevation angle greater than an elevation angle of any other satellite or spot beam in a Non-Terrestrial Network.

In a particular embodiment, the remaining service time is determined based on at least one of: geographical position information indicating a position of the wireless device relative to a beam center associated with the first satellite or first spot beam; satellite trajectory information associated with the first satellite or first spot beam, and location information indicating a plurality of locations where the wireless device has been located.

In a particular embodiment, the wireless device 110 is out-of-sync with the first satellite. When initiating the connection with the first satellite or first spot beam, the wireless device reinitiates a previous connection with the first satellite. Additionally, the method may further include determining, by the wireless device 110 a time to access ($T_{access}$) comprising an amount of time required to become in-sync with the first satellite; determining that the remaining service time is greater than or equal to the time to access; and based on the remaining service time being greater than or equal to the time to access, reinitiating the previous connection with the first satellite.

In a particular embodiment, the wireless device 110 is out-of-sync, and the wireless device 110 determines a time to access ($T_{access}$) based on a characteristic of the wireless device 110 and determines that the remaining service time is greater than or equal to the time to access. Based on the remaining service time being greater than or equal to the time to access, the wireless device 110 initiates the connection with the first satellite. The characteristic comprises or is associated with at least one of: a transmission power, a coverage enhancement level, a timing threshold associated with a coverage enhancement level, an elevation angle associated with the first satellite or first spot beam, a state of beam failure recovery of the wireless device, and an early data transmission procedure.

In a particular embodiment, the wireless device 110 obtains a remaining service time ($T_{service}$) associated with at least one additional satellite or at least one additional spot beam and ranks the first satellite or the first spot beam and the at least one additional satellite or the at least one additional spot beam in order of preference. Based on the order of preference, the wireless device selects the first satellite, the first spot beam, the at least one additional satellite, or the at least one additional spot beam based on the order of preference for initiating the connection.

In a particular embodiment, the wireless device 110 and the first satellite are operating in a Non-terrestrial Network, NTN.

Figure 16:
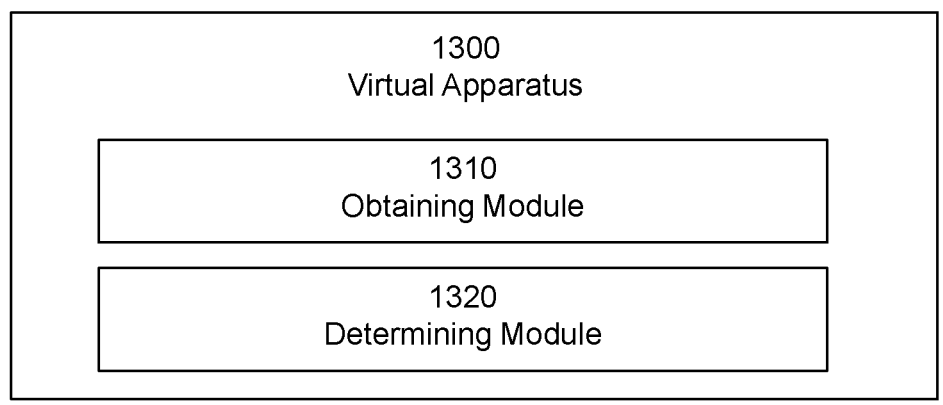
FIG. 16 illustrates another exemplary virtual computing device, according to certain embodiments.

FIG. 16 illustrates a schematic block diagram of a virtual apparatus 1300 in a wireless network (for example, the wireless network shown in FIG. 2). The apparatus may be implemented in a wireless device or network node (e.g., wireless device 110 or network node 160 shown in FIG. 2). Apparatus 1300 is operable to carry out the example method described with reference to FIG. 15 and possibly any other processes or methods disclosed herein. It is also to be understood that the method of FIG. 15 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1310, determining module 1320, and any other suitable units of apparatus 1300 to perform corresponding functions according one or more embodiments of the present disclosure.

According to certain embodiments, obtaining module 1310 may perform certain of the obtaining functions of the apparatus 1300. For example, obtaining module 1310 may obtain a remaining service time ($T_{service}$) associated with a first satellite or first spot beam.

According to certain embodiments, determining module 1320 may perform certain of the determining functions of the apparatus 1300. For example, determining module 1320 may determine whether to initiate a connection with the first satellite or first spot beam based on the remaining service time.

Figure 17:
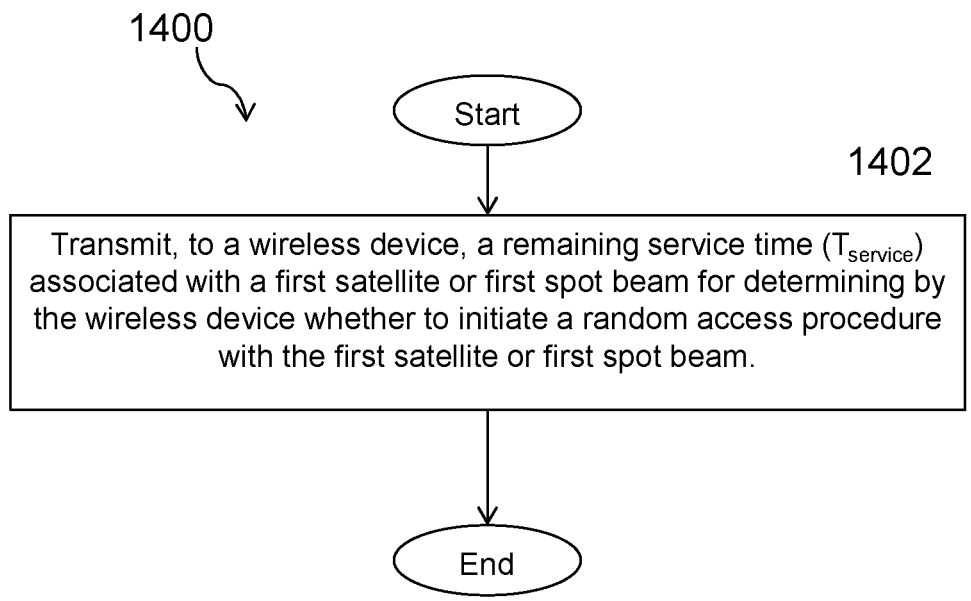
FIG. 17 illustrates an example method by a network node, according to certain embodiments.

FIG. 17 depicts a method 1400 performed by a network node 160, according to certain embodiments. At step 1402, the network node 160 transmits, to a wireless device, a remaining service time ($T_{service}$) associated with a first satellite or first spot beam for determining by the wireless device whether to initiate a random access procedure with the first satellite or first spot beam.

Figure 18:
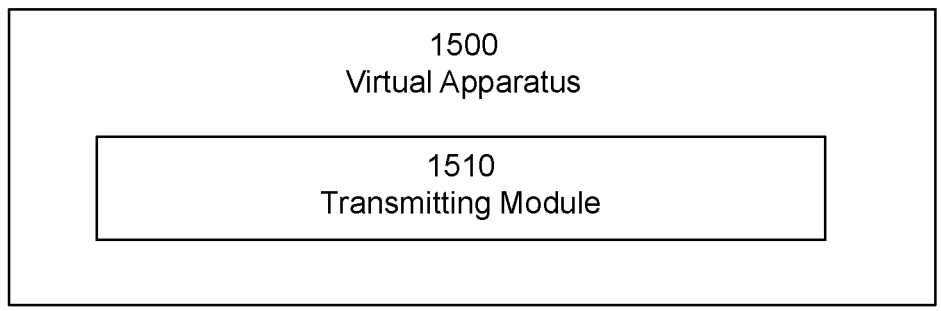
FIG. 18 illustrates another exemplary virtual computing device, according to certain embodiments.

FIG. 18 illustrates a schematic block diagram of a virtual apparatus 1500 in a wireless network (for example, the wireless network shown in FIG. 1). The apparatus may be implemented in a wireless device or network node (e.g., wireless device 110 or network node 160 shown in FIG. 1). Apparatus 1500 is operable to carry out the example method described with reference to FIG. 17 and possibly any other processes or methods disclosed herein. It is also to be understood that the method of FIG. 17 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1510 and any other suitable units of apparatus 1500 to perform corresponding functions according one or more embodiments of the present disclosure.

According to certain embodiments, transmitting module 1510 may perform certain of the transmitting functions of the apparatus 1500. For example, transmitting module 1510 may transmit, to a wireless device, a remaining service time ($T_{service}$) associated with a first satellite or first spot beam for determining by the wireless device whether to initiate a random access procedure with the first satellite or first spot beam.

Figure 19:
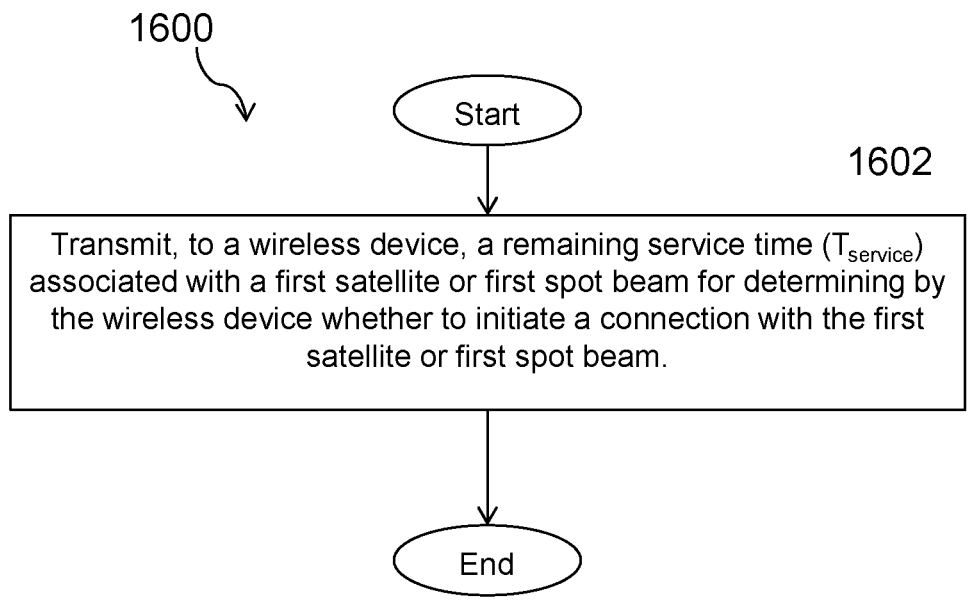
FIG. 19 illustrates another example method by a network node, according to certain embodiments.

FIG. 19 depicts a method 1600 performed by a network node 160, according to certain embodiments. It may be recognized that method 1600 provides a more specific example of method 1400 described above with regard to FIG. 17. At step 1602, the network node 160 transmits, to a wireless device 110, a remaining service time ($T_{service}$) associated with a first satellite or first spot beam for determining by the wireless device 110 whether to initiate a connection with the first satellite or first spot beam.

In a particular embodiment, the network node 160 configures the wireless device 110 to determine whether the remaining service time is greater than or equal to a threshold.

In a particular embodiment, the remaining service time comprises an amount of time before a service link associated with the first satellite or first spot beam is switched to a second satellite or second spot beam.

In a particular embodiment, the remaining service time comprises an amount of time until the first satellite or first spot beam goes out of coverage.

In a particular embodiment, the network node 160 configures the wireless device 110 to initiate the connection with the first satellite or first spot beam by initiating a random access procedure with the first satellite or first spot beam.

In a particular embodiment, the network node 160 configures the wireless device 110 to determine a time to access ($T_{access}$) comprising an amount of time required to initiate the connection with the first satellite or the first spot beam and determine that the remaining service time is greater than or equal to the time to access. Based on the remaining service time being greater than or equal to the time to access, the network node 160 initiates the connection with the first satellite or the first spot beam.

In a particular embodiment, the remaining service time comprises an amount of time during which the first satellite or first spot beam supports an elevation angle greater than or equal to a threshold elevation angle.

In a further particular embodiment, when the first satellite is moving towards the wireless device, the threshold elevation angle is less than when the first satellite is moving away from the wireless device 110.

In a particular embodiment, the elevation angle is measured relative to a reference location in a cell associated with the first satellite or first spot beam.

In a particular embodiment, the threshold elevation angle comprises a minimum required elevation angle for at least a minimum percentage of a cell coverage area.

In a particular embodiment, the remaining service time comprises an amount of time during which the first satellite or first spot beam supports an elevation angle greater than an elevation angle of any other satellite or spot beam in a Non-Terrestrial Network.

In a particular embodiment, the network node 160 calculates the elevation angle associated with the first satellite or first spot beam based at least in part on a geographical position of the wireless device 110.

In a particular embodiment, the network node 160 measures the elevation angle associated with the first satellite of first spot beam.

In a particular embodiment, the network node 160 transmits the elevation angle associated with the first satellite or the first spot beam to the wireless device 110.

In a particular embodiment, the remaining service time is determined based on at least one of: geographical position information indicating a position of the wireless device 110 relative to a beam center associated with the first satellite or first spot beam; satellite trajectory information associated with the first satellite or first spot beam; and location information indicating a plurality of locations where the wireless device 110 has been located.

In a particular embodiment, the wireless device 110 is out-of-sync with the network and initiating a connection with the first satellite comprises reinitiating a previous connection with the first satellite. In a particular embodiment, the network node 160 configures the wireless device 110 to determine a time to access ($T_{access}$) comprising an amount of time required to become in-sync with the first satellite; determine that the remaining service time is greater than or equal to the time to access; and based on the remaining service time being greater than or equal to the time to access, reinitiate the previous connection with the first satellite.

In a particular embodiment, the wireless device is out-of-sync, and the network node configures the wireless device 110 to determine a time to access ($T_{access}$) based on a characteristic of the wireless device and determine that the remaining service time is greater than or equal to the time to access. The wireless device 110 is configured to initiate the connection with the first satellite or first spot beam based on the remaining service time being greater than or equal to the time to access. The characteristic comprises or is associated with at least one of: a transmission power, a coverage enhancement level, a timing threshold associated with a coverage enhancement level, an elevation angle associated with the first satellite or first spot beam, a state of beam failure recovery of the wireless device 110, and an early data transmission procedure.

In a particular embodiment, the network node 160 obtains a remaining service time ($T_{service}$) associated with at least one additional satellite or at least one additional spot beam and ranks the first satellite or the first spot beam and the at least one additional satellite or the at least one additional spot beam in order of preference. Based on the order of preference, the network node 160 selects the first satellite, the first spot beam, the at least one additional satellite, or the at least one additional spot beam based on the order of preference for initiating the connection.

In a particular embodiment, the wireless device 110 and the first satellite are operating in a Non-terrestrial Network, NTN.

Figure 20:
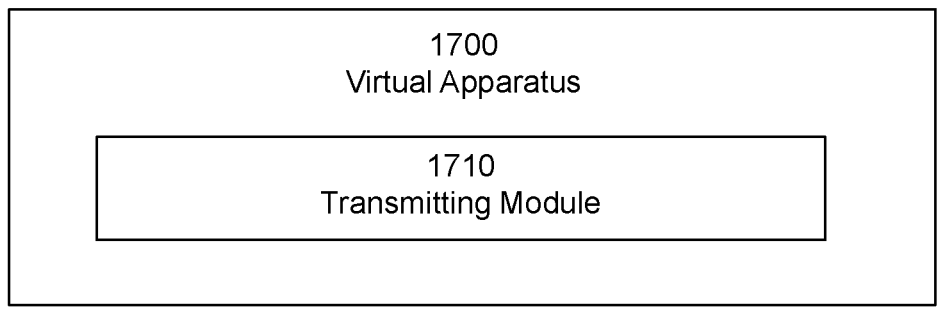
FIG. 20 illustrates another exemplary virtual computing device, according to certain embodiments.

FIG. 20 illustrates a schematic block diagram of a virtual apparatus 1700 in a wireless network (for example, the wireless network shown in FIG. 1). The apparatus may be implemented in a wireless device or network node (e.g., wireless device 110 or network node 160 shown in FIG. 1). Apparatus 1700 is operable to carry out the example method described with reference to FIG. 19 and possibly any other processes or methods disclosed herein. It is also to be understood that the method of FIG. 19 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1710 and any other suitable units of apparatus 1700 to perform corresponding functions according one or more embodiments of the present disclosure.

According to certain embodiments, transmitting module 1710 may perform certain of the transmitting functions of the apparatus 1700. For example, transmitting module 1710 may transmit, to a wireless device 110, a remaining service time ($T_{service}$) associated with a first satellite or first spot beam for determining by the wireless device 110 whether to initiate a connection with the first satellite or first spot beam.

EXAMPLE EMBODIMENTS

Example Embodiment 1. A method performed by a wireless device, the method comprising: obtaining a remaining service time ($T_{service}$) associated with a first satellite or first spot beam; and based on the remaining service time, taking at least one action.

Example Embodiment 2. The method of Example Embodiment 1, wherein taking the at least one action comprises determining whether the remaining service time is greater than or equal to a threshold.

Example Embodiment 3. The method of any one of Example Embodiments 1 to 2, wherein the remaining service time comprises an amount of time before a service link associated with the first satellite or first spot beam is switched to a second satellite or second spot beam.

Example Embodiment 4. The method of any one of Example Embodiments 1 to 3, wherein the remaining service time comprises an amount of time until the first satellite or first spot beam goes out of coverage.

Example Embodiment 5. The method of any one of Example Embodiments 1 to 4, wherein taking the at least one action comprises determining whether to initiate a random access procedure with the first satellite or first spot beam.

Example Embodiment 6. The method of any one of Example Embodiments 1 to 5, wherein taking the at least one action comprises: determining a time to access ($T_{access}$) comprising an amount of time required to initiate a connection with the first satellite; determining that the remaining service time is greater than or equal to the time to access; and based on the remaining service time being greater than or equal to the time to access, initiating the connection with the first satellite.

Example Embodiment 7. The method of any one of Example Embodiments 1 to 5, wherein taking the at least one action comprises: determining a time to access ($T_{access}$) comprising an amount of time required to initiate a connection with the first satellite; determining that the remaining service time is not greater than or equal to the time to access; and based on the remaining service time not being greater than or equal to the time to access, initiating a connection with a second satellite.

Example Embodiment 8. The method of any one of Example Embodiments 6 to 7, wherein the time to access includes a configured offset.

Example Embodiment 9. The method of any one of Example Embodiments 1 to 8, wherein obtaining the remaining service time comprises receiving the remaining service time from the first satellite.

Example Embodiment 10. The method of any one of Example Embodiments 1 to 9, wherein obtaining the remaining service time comprises receiving a signal comprising the remaining service time when the wireless device is sent from a connected mode to an inactive mode or an idle mode.

Example Embodiment 11. The method of any one of Example Embodiments 1 to 10, wherein the remaining service time is received in a signal or message comprising one or more handover parameters.

Example Embodiment 12. The method of any one of Example Embodiments 1 to 11 wherein the wireless device is in an idle mode, and wherein obtaining the remaining service time comprises transmitting a request for the remaining service time prior to initiating random access.

Example Embodiment 13. The method of any one of Example Embodiments 1 to 12, wherein the remaining service time comprises an amount of time during the first satellite supports an elevation angle greater than or equal to a threshold elevation angle.

Example Embodiment 14. The method of Example Embodiment 13, wherein when the first satellite is moving towards the wireless device the threshold elevation angle is less than when the first satellite is moving away from the wireless device.

Example Embodiment 15. The method of any one of Example Embodiments 13 to 14, wherein when the first satellite is moving towards the wireless device the threshold elevation angle is 10 degrees.

Example Embodiment 16. The method of any one of Example Embodiments 13 to 14, wherein when the first satellite is moving away from the wireless device the threshold elevation angle is 30 degrees.

Example Embodiment 17. The method of any one of Example Embodiments 13 to 16, wherein the elevation angle is measured relative to a reference location in a cell associated with the first satellite or first spot beam.

Example Embodiment 18. The method of any one of Example Embodiments 13 to 17, wherein the threshold elevation angle comprises a minimum required elevation angle for at least a minimum percentage of a cell coverage area.

Example Embodiment 19. The method of any one of Example Embodiments 1 to 18, wherein the remaining service time comprises an amount of time during the first satellite supports an elevation angle greater an elevation angle of any other satellite or spot beam in a Non-Terrestrial Network.

Example Embodiment 20. The method of any one of Example Embodiments 13 to 19, further comprising calculating the elevation angle associated with the first satellite based at least in part on a geographical position of the wireless device.

Example Embodiment 21. The method of any one of Example Embodiments 13 to 19, further comprising measuring the elevation angle associated with the first satellite.

Example Embodiment 22. The method of any one of Example Embodiments 13 to 19, further comprising receiving network signaling comprising the elevation angle associated with the first satellite.

Example Embodiment 23. The method of any one of Example Embodiments 1 to 22, further comprising: obtaining geographical position information associated with the wireless device; based on the geographical position information, determining that the wireless device is more proximate a beam center associated with the first satellite or the first spot beam than another satellite or another spot beam, and wherein the remaining service time is obtained based on the wireless device being more proximate the beam center associated with the first satellite.

Example Embodiment 24. The method of any one of Example Embodiments 1 to 23, wherein obtaining the remaining service time comprises determining the remaining service time based on satellite trajectory information associated with the first satellite or first spot beam.

Example Embodiment 25. The method of Example Embodiment 24, further comprising obtaining location information associated with the wireless device and wherein determining the remaining service time is additionally based on the location information associated with the wireless device.

Example Embodiment 26. The method of Example Embodiment 25, wherein the location information comprises information about a plurality of locations where the wireless device has been located.

Example Embodiment 27. The method of any one of Example Embodiments 1 to 26, wherein obtaining the remaining service time comprises: receiving at least one estimated remaining service time from a network; and determining, by the wireless device, at least one actual remaining service time.

Example Embodiment 28. The method of Example Embodiment 27, wherein taking the at least one action comprises taking an action to reduce a difference between the at least one estimated remaining service time from the network and the actual remaining service time determined by the wireless device.

Example Embodiment 29. The method of any one of Example Embodiments 27 to 28, wherein the at least one estimated remaining service time from the network comprises a high estimated remaining service time and a low estimated remaining service time.

Example Embodiment 30. The method of Example Embodiment 29, further comprising determining whether to use the high estimated remaining service time or the low estimated remaining service time based on at least one of: a signal strength of the wireless device; a doppler sign; and a characteristic of the wireless device.

Example Embodiment 31. The method of any one of Example Embodiments 1 to 30, further comprising: determining a doppler shift difference between a service link associated with the first satellite or first spot beam and a service link associated with a second satellite or a second spot beam, and wherein taking the at least one action comprises selecting one of the first satellite/first spot beam or the second satellite/second spot beam based on the doppler shift difference.

Example Embodiment 32. The method of Example Embodiment 31, wherein the first satellite/first spot beam is a serving satellite/spot beam and the second satellite/second spot beam is a non-serving satellite/spot beam, and the method further comprises: selecting the non-serving satellite/spot beam in response to determining that the downlink doppler shift is higher for the non-serving satellite/spot beam than the doppler shift of the serving satellite/spot beam.

Example Embodiment 33. The method of any one of Example Embodiments 31 to 32, further comprising at least one measurement for cell selection or reselection, and wherein at least one measurement value associated with the at least one measurement is used in addition to the doppler shift to select the one of the first satellite/first spot beam or the second satellite/second spot beam.

Example Embodiment 34. The method of any one of Example Embodiments 1 to 33, wherein the remaining time of service comprises a time until a service link is switched from the first satellite or first spot beam to a second satellite or second spot beam.

Example Embodiment 35. The method of any one of Example Embodiments 1 to 34, wherein the wireless device is out-of-sync, and wherein taking the at least one action comprises: determining a time to access ($T_{access}$) comprising an amount of time required to become in-sync with the first satellite; determining that the remaining service time is greater than or equal to the time to access; and based on the remaining service time being greater than or equal to the time to access, initiating the connection with the first satellite.

Example Embodiment 36. The method of any one of Example Embodiments 1 to 34, wherein the wireless device is out-of-sync, and wherein taking the at least one action comprises: determining a time to access ($T_{access}$) based on whether the wireless device is in an idle or inactive state; determining that the remaining service time is greater than or equal to the time to access; and based on the remaining service time being greater than or equal to the time to access, initiating the connection with the first satellite.

Example Embodiment 37. The method of Example Embodiment 36, wherein a value of the time to access is greater if the wireless device is in the idle state than if the wireless device is in the inactive state.

Example Embodiment 38. The method of any one of Example Embodiments 1 to 34, wherein the wireless device is out-of-sync, and wherein taking the at least one action comprises: determining a time to access ($T_{access}$) based on a characteristic of the wireless device; determining that the remaining service time is greater than or equal to the time to access; and based on the remaining service time being greater than or equal to the time to access, initiating the connection with the first satellite.

Example Embodiment 39. The method of Example Embodiment 38, wherein the characteristic comprises or is associated with at least one of: a transmission power, a coverage enhancement level, a timing threshold associated with a coverage enhancement level, an elevation angle associated with the first satellite or first spot beam, a state of beam failure recovery of the wireless device, and an early data transmission procedure.

Example Embodiment 40. The method of any one of Example Embodiments 1 to 39, wherein taking at least one action based on the remaining service time comprises determining whether a cell associated with the first satellite or the first spot beam is suitable for connecting to the wireless device based on the remaining service time.

Example Embodiment 41. The method of Example Embodiment 40, further comprising determining an elevation angle associated with the first satellite or the first spot beam, and wherein determining whether the cell associated with the first satellite or the first spot beam is suitable for connecting to the wireless device is additionally based on the elevation angle.

Example Embodiment 42. The method of any one of Example Embodiments 40 to 41, wherein determining whether the cell associated with the first satellite or the first spot beam is suitable for connecting to the wireless device based on the remaining service time comprises determining a cell suitability value and comparing the cell suitability value to a minimum or threshold cell suitability value.

Example Embodiment 43. The method of Example Embodiment 42, wherein the minimum or threshold cell suitability is selected from a plurality of minimum or threshold cell suitability values based on the elevation angle associated with the first satellite or first spot beam.

Example Embodiment 44. The method of Example Embodiment 42, wherein the minimum or threshold cell suitability is selected from a plurality of minimum or threshold cell suitability values based on a coverage enhancement level of the wireless device.

Example Embodiment 45. The method of any one of Example Embodiments 1 to 44, further comprising obtaining a remaining service time ($T_{service}$) associated with at least one additional satellite or at least one additional spot beam, wherein taking the at least one action comprises: ranking the first satellite and/or first spot beam and/or at least one additional satellite and/or at least one additional spot beam in order of preference; and based on the order of preference, selecting the first satellite and/or first spot beam and/or at least one additional satellite and/or at least one additional spot beam based on the order of preference for initiating a random access procedure.

Example Embodiment 46. The method of any one of Example Embodiments 1 to 45, wherein the wireless device and the first satellite are operating in a Non-terrestrial Network, NTN.

Example Embodiment 47. A computer program comprising instructions which when executed on a computer perform any of the methods of Example Embodiments 1 to 46.

Example Embodiment 48. A computer program product comprising computer program, the computer program comprising instructions which when executed on a computer perform any of the methods of Example Embodiments 1 to 46.

Example Embodiment 49. A non-transitory computer readable medium storing instructions which when executed by a computer perform any of the methods of Example Embodiments 1 to 46.

Example Embodiment 50. A method performed by a network node, the method comprising: configuring a wireless device to obtain a remaining service time ($T_{service}$) associated with a first satellite or first spot beam; and configuring the wireless device to take at least one action based on the remaining service time.

Example Embodiment 51. The method of Example Embodiment 50, wherein configuring the wireless device to take the at least one action comprises configuring the wireless device to determine whether the remaining service time is greater than or equal to a threshold.

Example Embodiment 52. The method of any one of Example Embodiments 50 to 51, wherein the remaining service time comprises an amount of time before a service link associated with the first satellite or first spot beam is switched to a second satellite or second spot beam.

Example Embodiment 53. The method of any one of Example Embodiments 50 to 52, wherein the remaining service time comprises an amount of time until the first satellite or first spot beam goes out of coverage.

Example Embodiment 54. The method of any one of Example Embodiments 50 to 53, wherein configuring the wireless device to take the at least one action comprises configuring the wireless device to determine whether to initiate a random access procedure with the first satellite or first spot beam.

Example Embodiment 55. The method of any one of Example Embodiments 50 to 54, wherein configuring the wireless device to take the at least one action comprises configuring the wireless device to: determine a time to access ($T_{access}$) comprising an amount of time required to initiate a connection with the first satellite; determine that the remaining service time is greater than or equal to the time to access; and based on the remaining service time being greater than or equal to the time to access, initiate the connection with the first satellite.

Example Embodiment 56. The method of any one of Example Embodiments 50 to 54, wherein configuring the wireless device to take the at least one action comprises configuring the wireless device to: determine a time to access ($T_{access}$) comprising an amount of time required to initiate a connection with the first satellite; determine that the remaining service time is not greater than or equal to the time to access; and based on the remaining service time not being greater than or equal to the time to access, initiate a connection with a second satellite.

Example Embodiment 57. The method of any one of Example Embodiments 55 to 56, wherein the time to access includes a configured offset.

Example Embodiment 58. The method of any one of Example Embodiments 50 to 57, further comprising transmitting the remaining service time to the wireless device.

Example Embodiment 59. The method of any one of Example Embodiments 50 to 58, further comprising transmitting a signal to the wireless device, the signal comprising the remaining service time as measured from when the wireless device transitions from a connected mode to an inactive mode or an idle mode.

Example Embodiment 60. The method of any one of Example Embodiments 50 to 59, further comprising transmitting, to the wireless device, the remaining service time with one or more handover parameters.

Example Embodiment 61. The method of any one of Example Embodiments 50 to 60, further comprising receiving a request for the remaining service time from the wireless device when the wireless is in an idle mode, and transmitting the remaining service time to the wireless device after receiving the request.

Example Embodiment 62. The method of any one of Example Embodiments 50 to 61, wherein the remaining service time comprises an amount of time during the first satellite supports an elevation angle greater than or equal to a threshold elevation angle.

Example Embodiment 63. The method of Example Embodiment 62, wherein when the first satellite is moving towards the wireless device the threshold elevation angle is less than when the first satellite is moving away from the wireless device.

Example Embodiment 64. The method of any one of Example Embodiments 62 to 63, wherein when the first satellite is moving towards the wireless device the threshold elevation angle is 10 degrees.

Example Embodiment 65. The method of any one of Example Embodiments 62 to 63, wherein when the first satellite is moving away from the wireless device the threshold elevation angle is 30 degrees.

Example Embodiment 66. The method of any one of Example Embodiments 62 to 65, wherein the elevation angle is measured relative to a reference location in a cell associated with the first satellite or first spot beam.

Example Embodiment 67. The method of any one of Example Embodiments 62 to 66, wherein the threshold elevation angle comprises a minimum required elevation angle for at least a minimum percentage of a cell coverage area.

Example Embodiment 68. The method of any one of Example Embodiments 50 to 67, wherein the remaining service time comprises an amount of time during the first satellite supports an elevation angle greater an elevation angle of any other satellite or spot beam in a Non-Terrestrial Network.

Example Embodiment 69. The method of any one of Example Embodiments 62 to 68, further comprising calculating the elevation angle associated with the first satellite based at least in part on a geographical position of the wireless device.

Example Embodiment 70. The method of any one of Example Embodiments 62 to 68, further comprising measuring the elevation angle associated with the first satellite.

Example Embodiment 71. The method of any one of Example Embodiments 62 to 70, further comprising transmitting the elevation angle associated with the first satellite to the wireless device.

Example Embodiment 72. The method of any one of Example Embodiments 50 to 71, further comprising: obtaining geographical position information associated with the wireless device; based on the geographical position information, determining that the wireless device is more proximate a beam center associated with the first satellite or the first spot beam than another satellite or another spot beam, and wherein the remaining service time is obtained based on the wireless device being more proximate the beam center associated with the first satellite.

Example Embodiment 73. The method of any one of Example Embodiments 50 to 72, wherein the remaining service time is determined based on the satellite trajectory information associated with the first satellite or first spot beam.

Example Embodiment 75. The method of Example Embodiment 73, further comprising obtaining location information associated with the wireless device and wherein determining the remaining service time is additionally based on the location information associated with the wireless device.

Example Embodiment 76. The method of Example Embodiment 74, further comprising: transmitting at least one estimated remaining service time to the wireless device; and configuring the wireless device to determine at least one actual remaining service time.

Example Embodiment 77. The method of Example Embodiment 76, wherein configuring the wireless device to take the at least one action comprises configuring the wireless device to take an action to reduce a difference between the at least one estimated remaining service time from the network and the actual remaining service time determined by the wireless device.

Example Embodiment 78. The method of Example Embodiment 77, wherein the at least one estimated remaining service time comprises a high estimated remaining service time and a low estimated remaining service time.

Example Embodiment 79. The method of Example Embodiment 78, further comprising determining whether to use the high estimated remaining service time or the low estimated remaining service time based on at least one of: a signal strength of the wireless device; a doppler sign; and a characteristic of the wireless device.

Example Embodiment 80. The method of any one of Example Embodiments 50 to 79, further comprising: determining a doppler shift difference between a service link associated with the first satellite or first spot beam and a service link associated with a second satellite or a second spot beam, and wherein taking the at least one action comprises selecting one of the first satellite/first spot beam or the second satellite/second spot beam based on the doppler shift difference.

Example Embodiment 81. The method of Example Embodiment 80, wherein the first satellite/first spot beam is a serving satellite/spot beam and the second satellite/second spot beam is a non-serving satellite/spot beam, and the method further comprises configuring the wireless device to select the non-serving satellite/spot beam in response to determining that the downlink doppler shift is higher for the non-serving satellite/spot beam than the doppler shift of the serving satellite/spot beam.

Example Embodiment 82. The method of any one of Example Embodiments 80 to 81, further comprising configuring the wireless device to perform at least one measurement for cell selection or reselection, and wherein at least one measurement value associated with the at least one measurement is used in addition to the doppler shift to select the one of the first satellite/first spot beam or the second satellite/second spot beam.

Example Embodiment 83. The method of any one of Example Embodiments 80 to 82, wherein the remaining time of service comprises a time until a service link is switched from the first satellite or first spot beam to a second satellite or second spot beam.

Example Embodiment 84. The method of any one of Example Embodiments 80 to 83, wherein the wireless device is out-of-sync, and wherein configuring the wireless device to take the at least one action comprises configuring the wireless device to: determine a time to access ($T_{access}$) comprising an amount of time required to become in-sync with the first satellite; determine that the remaining service time is greater than or equal to the time to access; and based on the remaining service time being greater than or equal to the time to access, initiate the connection with the first satellite.

Example Embodiment 85. The method of any one of Example Embodiments 50 to 83, wherein the wireless device is out-of-sync, and wherein configuring the wireless device to take the at least one action comprises configuring the wireless device to: determine a time to access ($T_{access}$) based on whether the wireless device is in an idle or inactive state; determine that the remaining service time is greater than or equal to the time to access; and based on the remaining service time being greater than or equal to the time to access, initiate the connection with the first satellite.

Example Embodiment 86. The method of Example Embodiment 85, wherein a value of the time to access is greater if the wireless device is in the idle state than if the wireless device is in the inactive state.

Example Embodiment 87. The method of any one of Example Embodiments 50 to 86, wherein the wireless device is out-of-sync, and wherein configuring the wireless device to take the at least one action comprises configuring the wireless device to: determine a time to access ($T_{access}$) based on a characteristic of the wireless device; determine that the remaining service time is greater than or equal to the time to access; and based on the remaining service time being greater than or equal to the time to access, initiate the connection with the first satellite.

Example Embodiment 88. The method of Example Embodiment 87, wherein the characteristic comprises or is associated with at least one of: a transmission power, a coverage enhancement level, a timing threshold associated with a coverage enhancement level, an elevation angle associated with the first satellite or first spot beam, a state of beam failure recovery of the wireless device, and an early data transmission procedure.

Example Embodiment 89. The method of any one of Example Embodiments 50 to 88, wherein configuring the wireless device to take at least one action based on the remaining service time comprises configuring the wireless device to determine whether a cell associated with the first satellite or the first spot beam is suitable for connecting to the wireless device based on the remaining service time.

Example Embodiment 90. The method of Example Embodiment 89, further comprising configuring the wireless device to determine an elevation angle associated with the first satellite or the first spot beam, and wherein determining whether the cell associated with the first satellite or the first spot beam is suitable for connecting to the wireless device is additionally based on the elevation angle.

Example Embodiment 91. The method of any one of Example Embodiments 89 to 90, wherein determining whether the cell associated with the first satellite or the first spot beam is suitable for connecting to the wireless device based on the remaining service time comprises determining a cell suitability value and comparing the cell suitability value to a minimum or threshold cell suitability value.

Example Embodiment 92. The method of Example Embodiment 91, wherein the minimum or threshold cell suitability is selected from a plurality of minimum or threshold cell suitability values based on the elevation angle associated with the first satellite or first spot beam.

Example Embodiment 93. The method of Example Embodiment 91, wherein the minimum or threshold cell suitability is selected from a plurality of minimum or threshold cell suitability values based on a coverage enhancement level of the wireless device.

Example Embodiment 94. The method of any one of Example Embodiments 50 to 93, further comprising: obtaining a remaining service time ($T_{service}$) associated with at least one additional satellite or at least one additional spot beam; ranking the first satellite and/or first spot beam and/or at least one additional satellite and/or at least one additional spot beam in order of preference; and based on the order of preference, selecting the first satellite and/or first spot beam and/or at least one additional satellite and/or at least one additional spot beam based on the order of preference for initiating a random access procedure.

Example Embodiment 95. The method of any one of Example Embodiments 50 to 94, wherein the wireless device and the first satellite are operating in a Non-terrestrial Network, NTN.

Example Embodiment 96. A computer program comprising instructions which when executed on a computer perform any of the methods of Example Embodiments 50 to 95.

Example Embodiment 97. A computer program product comprising computer program, the computer program comprising instructions which when executed on a computer perform any of the methods of Example Embodiments 50 to 95.

Example Embodiment 98. A non-transitory computer readable medium storing instructions which when executed by a computer perform any of the methods of Example Embodiments 50 to 95.

Example Embodiment 99. A method performed by a network node, the method comprising: transmitting, to a wireless device, a remaining service time ($T_{service}$) associated with a first satellite or first spot beam for determining by the wireless device whether to initiate a random access procedure with the first satellite or first spot beam.

Example Embodiment 100. The method of Example Embodiment 99, further comprising configuring the wireless device to determine whether the remaining service time is greater than or equal to a threshold.

Example Embodiment 101. The method of any one of Example Embodiments 99 to 100, wherein the remaining service time comprises an amount of time before a service link associated with the first satellite or first spot beam is switched to a second satellite or second spot beam.

Example Embodiment 102. The method of any one of Example Embodiments 99 to 101, wherein the remaining service time comprises an amount of time until the first satellite or first spot beam goes out of coverage.

Example Embodiment 103. The method of any one of Example Embodiments 99 to 102, further comprising configuring the wireless device to: determine a time to access ($T_{access}$) comprising an amount of time required to initiate a connection with the first satellite; determine that the remaining service time is greater than or equal to the time to access; and based on the remaining service time being greater than or equal to the time to access, initiate the connection with the first satellite.

Example Embodiment 104. The method of any one of Example Embodiments 99 to 102, further comprising configuring the wireless device to: determine a time to access ($T_{access}$) comprising an amount of time required to initiate a connection with the first satellite; determine that the remaining service time is not greater than or equal to the time to access; and based on the remaining service time not being greater than or equal to the time to access, initiate a connection with a second satellite.

Example Embodiment 105. The method of any one of Example Embodiments 103 to 104, wherein the time to access includes a configured offset.

Example Embodiment 106. The method of any one of Example Embodiments 99 to 105, further comprising receiving a request for the remaining service time from the wireless device when the wireless device is in an idle mode.

Example Embodiment 107. The method of any one of Example Embodiments 99 to 106, wherein the remaining service time comprises an amount of time during the first satellite supports an elevation angle greater than or equal to a threshold elevation angle.

Example Embodiment 108. The method of Example Embodiment 107, wherein when the first satellite is moving towards the wireless device the threshold elevation angle is less than when the first satellite is moving away from the wireless device.

Example Embodiment 109. The method of any one of Example Embodiments 107 to 108, wherein when the first satellite is moving towards the wireless device the threshold elevation angle is 10 degrees.

Example Embodiment 110. The method of any one of Example Embodiments 107 to 108, wherein when the first satellite is moving away from the wireless device the threshold elevation angle is 30 degrees.

Example Embodiment 111. The method of any one of Example Embodiments 107 to 110, wherein the elevation angle is measured relative to a reference location in a cell associated with the first satellite or first spot beam.

Example Embodiment 112. The method of any one of Example Embodiments 107 to 111, wherein the threshold elevation angle comprises a minimum required elevation angle for at least a minimum percentage of a cell coverage area.

Example Embodiment 113. The method of any one of Example Embodiments 107 to 112, wherein the remaining service time comprises an amount of time during the first satellite supports an elevation angle greater an elevation angle of any other satellite or spot beam in a Non-Terrestrial Network.

Example Embodiment 114. The method of any one of Example Embodiments 107 to 113, further comprising calculating the elevation angle associated with the first satellite based at least in part on a geographical position of the wireless device.

Example Embodiment 115. The method of any one of Example Embodiments 107 to 113, further comprising measuring the elevation angle associated with the first satellite.

Example Embodiment 116. The method of any one of Example Embodiments 107 to 115, further comprising transmitting the elevation angle associated with the first satellite to the wireless device.

Example Embodiment 117. The method of any one of Example Embodiments 99 to 116, further comprising: obtaining geographical position information associated with the wireless device; based on the geographical position information, determining that the wireless device is more proximate a beam center associated with the first satellite or the first spot beam than another satellite or another spot beam, and wherein the remaining service time is obtained based on the wireless device being more proximate the beam center associated with the first satellite.

Example Embodiment 118. The method of any one of Example Embodiments 99 to 117, wherein the remaining service time is determined based on the satellite trajectory information associated with the first satellite or first spot beam.

Example Embodiment 119. The method of Example Embodiment 118, further comprising obtaining location information associated with the wireless device and wherein determining the remaining service time is additionally based on the location information associated with the wireless device.

Example Embodiment 120. The method of Example Embodiment 119, wherein the location information comprises information about a plurality of locations where the wireless device has been located.

Example Embodiment 121. The method of any one of Example Embodiments 99 to 120, further comprising: transmitting at least one estimated remaining service time to the wireless device; and configuring the wireless device to determine at least one actual remaining service time and take an action to reduce a difference between the at least one estimated remaining service time from the network and the actual remaining service time determined by the wireless device.

Example Embodiment 122. The method of Example Embodiment 121, wherein the at least one estimated remaining service time comprises a high estimated remaining service time and a low estimated remaining service time.

Example Embodiment 123. The method of Example Embodiment 122, further comprising configuring the wireless device to determine whether to use the high estimated remaining service time or the low estimated remaining service time based on at least one of: a signal strength of the wireless device; a doppler sign; and a characteristic of the wireless device.

Example Embodiment 124. The method of any one of Example Embodiments 99 to 123, further comprising: determining a doppler shift difference between a service link associated with the first satellite or first spot beam and a service link associated with a second satellite or a second spot beam, and wherein configuring the wireless device to take the at least one action comprises configuring the wireless device to select one of the first satellite/first spot beam or the second satellite/second spot beam based on the doppler shift difference.

Example Embodiment 125. The method of Example Embodiment 124, wherein the first satellite/first spot beam is a serving satellite/spot beam and the second satellite/second spot beam is a non-serving satellite/spot beam, and the method further comprises configuring the wireless device to select the non-serving satellite/spot beam in response to determining that the downlink doppler shift is higher for the non-serving satellite/spot beam than the doppler shift of the serving satellite/spot beam.

Example Embodiment 126. The method of any one of Example Embodiments 124 to 125, further comprising configuring the wireless device to perform at least one measurement for cell selection or reselection, and wherein at least one measurement value associated with the at least one measurement is used in addition to the doppler shift to select the one of the first satellite/first spot beam or the second satellite/second spot beam.

Example Embodiment 127. The method of any one of Example Embodiments 99 to 126, wherein the remaining time of service comprises a time until a service link is switched from the first satellite or first spot beam to a second satellite or second spot beam.

Example Embodiment 128. The method of any one of Example Embodiments 99 to 127, wherein the wireless device is out-of-sync, and the method further comprises configuring the wireless device to: determine a time to access ($T_{access}$) comprising an amount of time required to become in-sync with the first satellite; determine that the remaining service time is greater than or equal to the time to access; and based on the remaining service time being greater than or equal to the time to access, initiate the connection with the first satellite.

Example Embodiment 129. The method of any one of Example Embodiments 99 to 127, wherein the wireless device is out-of-sync, and the method further comprises configuring the wireless device to: determine a time to access ($T_{access}$) based on whether the wireless device is in an idle or inactive state; determine that the remaining service time is greater than or equal to the time to access; and based on the remaining service time being greater than or equal to the time to access, initiate the connection with the first satellite.

Example Embodiment 130. The method of Example Embodiment 129, wherein a value of the time to access is greater if the wireless device is in the idle state than if the wireless device is in the inactive state.

Example Embodiment 131. The method of any one of Example Embodiments 99 to 123, wherein the wireless device is out-of-sync, and the method further comprises configuring the wireless device to: determine a time to access ($T_{access}$) based on a characteristic of the wireless device; determine that the remaining service time is greater than or equal to the time to access; and based on the remaining service time being greater than or equal to the time to access, initiate the connection with the first satellite.

Example Embodiment 132. The method of Example Embodiment 131, wherein the characteristic comprises or is associated with at least one of: a transmission power, a coverage enhancement level, a timing threshold associated with a coverage enhancement level, an elevation angle associated with the first satellite or first spot beam, a state of beam failure recovery of the wireless device, and an early data transmission procedure.

Example Embodiment 133. The method of any one of Example Embodiments 99 to 132, further comprising configuring the wireless device to determine whether a cell associated with the first satellite or the first spot beam is suitable for connecting to the wireless device based on the remaining service time.

Example Embodiment 134. The method of Example Embodiment 133, further comprising configuring the wireless device to determine an elevation angle associated with the first satellite or the first spot beam, and wherein determining whether the cell associated with the first satellite or the first spot beam is suitable for connecting to the wireless device is additionally based on the elevation angle.

Example Embodiment 135. The method of any one of Example Embodiments 133 to 134, wherein determining whether the cell associated with the first satellite or the first spot beam is suitable for connecting to the wireless device based on the remaining service time comprises determining a cell suitability value and comparing the cell suitability value to a minimum or threshold cell suitability value.

Example Embodiment 136. The method of Example Embodiment 135, wherein the minimum or threshold cell suitability is selected from a plurality of minimum or threshold cell suitability values based on the elevation angle associated with the first satellite or first spot beam.

Example Embodiment 137. The method of Example Embodiment 135, wherein the minimum or threshold cell suitability is selected from a plurality of minimum or threshold cell suitability values based on a coverage enhancement level of the wireless device.

Example Embodiment 138. The method of any one of Example Embodiments 99 to 137, further comprising: obtaining a remaining service time ($T_{service}$) associated with at least one additional satellite or at least one additional spot beam; ranking the first satellite and/or first spot beam and/or at least one additional satellite and/or at least one additional spot beam in order of preference; and based on the order of preference, selecting the first satellite and/or first spot beam and/or at least one additional satellite and/or at least one additional spot beam based on the order of preference for initiating a random access procedure.

Example Embodiment 139. The method of any one of Example Embodiments 99 to 138, wherein the wireless device and the first satellite are operating in a Non-terrestrial Network, NTN.

Example Embodiment 140. A computer program comprising instructions which when executed on a computer perform any of the methods of Example Embodiments 99 to 139.

Example Embodiment 141. A computer program product comprising computer program, the computer program comprising instructions which when executed on a computer perform any of the methods of Example Embodiments 99 to 139.

Example Embodiment 142. A non-transitory computer readable medium storing instructions which when executed by a computer perform any of the methods of Example Embodiments 99 to 139.

Example Embodiment 143. A wireless device comprising: processing circuitry configured to perform any of the steps of any of Example Embodiments 1 to 49; and power supply circuitry configured to supply power to the wireless device.

Example Embodiment 144. A network node comprising: processing circuitry configured to perform any of the steps of any of Example Embodiments 50 to 142; power supply circuitry configured to supply power to the wireless device.

Example Embodiment 145. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 1 to 49; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Example Embodiment 146. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of Example Embodiments 50 to 142.

Example Embodiment 147. The communication system of the pervious embodiment further including the network node.

Example Embodiment 148. The communication system of the previous 2 embodiments, further including the wireless device, wherein the wireless device is configured to communicate with the network node.

Example Embodiment 149. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 150. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of Example Embodiments 50 to 142.

Example Embodiment 151. The method of the previous embodiment, further comprising, at the network node, transmitting the user data.

Example Embodiment 152. The method of the previous 2 embodiments, wherein the user data is provided at the host computer by executing a host application, the method further comprising, at the wireless device, executing a client application associated with the host application.

Example Embodiment 153. A wireless device configured to communicate with a network node, the wireless device comprising a radio interface and processing circuitry configured to performs the of the previous 3 embodiments.

Example Embodiment 154. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps of any of Example Embodiments 1 to 49.

Example Embodiment 155. The communication system of the previous embodiment, wherein the cellular network further includes a network node configured to communicate with the wireless device.

Example Embodiment 156. The communication system of the previous 2 embodiments, wherein: the processing circuitry of the host computer is configured to execute a host application, thereby providing the user data; and the wireless device's processing circuitry is configured to execute a client application associated with the host application.

Example Embodiment 157. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps of any of Example Embodiments 1 to 49.

Example Embodiment 158. The method of the previous embodiment, further comprising at the wireless device, receiving the user data from the network node.

Example Embodiment 159. A communication system including a host computer comprising: communication interface configured to receive user data originating from a transmission from a wireless device to a network node, wherein the wireless device comprises a radio interface and processing circuitry, the wireless device's processing circuitry configured to perform any of the steps of any of Example Embodiments 1 to 49.

Example Embodiment 160. The communication system of the previous embodiment, further including the wireless device.

Example Embodiment 161. The communication system of the previous 2 embodiments, further including the network node, wherein the network node comprises a radio interface configured to communicate with the wireless device and a communication interface configured to forward to the host computer the user data carried by a transmission from the wireless device to the network node.

Example Embodiment 162. The communication system of the previous 3 embodiments, wherein: the processing circuitry of the host computer is configured to execute a host application; and the wireless device's processing circuitry is configured to execute a client application associated with the host application, thereby providing the user data.

Example Embodiment 163. The communication system of the previous 4 embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment 164. A method implemented in a communication system including a host computer, a network node and a wireless device, the method comprising: at the host computer, receiving user data transmitted to the network node from the wireless device, wherein the wireless device performs any of the steps of any of Example Embodiments 1 to 49.

Example Embodiment 165. The method of the previous embodiment, further comprising, at the wireless device, providing the user data to the network node.

Example Embodiment 166. The method of the previous 2 embodiments, further comprising: at the wireless device, executing a client application, thereby providing the user data to be transmitted; and at the host computer, executing a host application associated with the client application.

Example Embodiment 167. The method of the previous 3 embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment 168. A communication system including a host computer comprising a communication interface configured to receive user data originating from a transmission from a wireless device to a network node, wherein the network node comprises a radio interface and processing circuitry, the network node's processing circuitry configured to perform any of the steps of any of Example Embodiments 50 to 142.

Example Embodiment 169. The communication system of the previous embodiment further including the network node.

Example Embodiment 170. The communication system of the previous 2 embodiments, further including the wireless device, wherein the wireless device is configured to communicate with the network node.

Example Embodiment 171. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 172. A method implemented in a communication system including a host computer, a network node and a wireless device, the method comprising: at the host computer, receiving, from the base station, user data originating from a transmission which the network node has received from the wireless device, wherein the wireless device performs any of the steps of any of Example Embodiments 1 to 49.

Example Embodiment 173. The method of the previous embodiment, further comprising at the network node receiving the user data from the wireless device.

Example Embodiment 174. The method of the previous 2 embodiments, further comprising at the network node, initiating a transmission of the received user data to the host computer.

Example Embodiment 175. The method of any of the previous embodiments, wherein the network node comprises a base station.

Example Embodiment 176. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device, the method comprising:
    obtaining a remaining service time (Tservice) associated with a first satellite or first spot beam;
    determining a time to access (Taccess) comprising an amount of time required to initiate a connection with the first satellite or the first spot beam;
    determining whether the remaining service time is greater than or equal to the time to access; and
    when the remaining service time is greater than or equal to the time to access, initiating the connection with the first satellite or first spot beam, or when the remaining service time is not greater than or equal to the time to access, initiating a connection with a second satellite or a second spot beam.

2. The method of claim 1, wherein the remaining service time comprises an amount of time before a service link associated with the first satellite or first spot beam is switched to a second satellite or second spot beam.

3. The method of claim 1, wherein the remaining service time comprises an amount of time until the first satellite or first spot beam goes out of coverage.

4. The method of claim 1, wherein initiating the connection with the first satellite or first spot beam comprises initiating a random access procedure with the first satellite or first spot beam.

5. The method of claim 1, wherein obtaining the remaining service time comprises receiving the remaining service time from the first satellite.

6. The method of claim 1, wherein the remaining service time comprises an amount of time during which the first satellite supports an elevation angle greater than or equal to a threshold elevation angle.

7. The method of claim 6, wherein when the first satellite is moving towards the wireless device the threshold elevation angle is less than when the first satellite is moving away from the wireless device.

8. The method of claim 6, wherein the threshold elevation angle comprises a minimum required elevation angle for at least a minimum percentage of a cell coverage area.

9. The method of claim 1, wherein the remaining service time comprises an amount of time during which the first satellite supports an elevation angle greater than an elevation angle of any other satellite or spot beam in a Non-Terrestrial Network.

10. The method of claim 1, wherein the remaining service time is determined based on at least one of:
   geographical position information indicating a position of the wireless device relative to a beam center associated with the first satellite or first spot beam,
   satellite trajectory information associated with the first satellite or first spot beam, and
   location information indicating a plurality of locations where the wireless device has been located.

11. The method of claim 1, wherein:
   the wireless device is out-of-sync with the first satellite, and
   initiating the connection with the first satellite or first spot beam comprises reinitiating a previous connection with the first satellite, and
   the method further comprises:
   determining a time to access (Taccess) comprising an amount of time required to become in-sync with the first satellite;
   determining that the remaining service time is greater than or equal to the time to access; and
   based on the remaining service time being greater than or equal to the time to access, reinitiating the previous connection with the first satellite.

12. The method of claim 1, wherein:
   the time to access (Taccess) is determined based on a characteristic of the wireless device;
   the wireless device is out-of-sync; and
   the characteristic comprises or is associated with at least one of: a transmission power, a coverage enhancement level, a timing threshold associated with a coverage enhancement level, an elevation angle associated with the first satellite or first spot beam, a state of beam failure recovery of the wireless device, and an early data transmission procedure.

13. The method of claim 1, further comprising:
   obtaining a remaining service time (Tservice) associated with at least one additional satellite or at least one additional spot beam;
   ranking the first satellite or the first spot beam and the at least one additional satellite or the at least one additional spot beam in order of preference; and
   based on the order of preference, selecting the first satellite, the first spot beam, the at least one additional satellite, or the at least one additional spot beam based on the order of preference for initiating the connection.

14. The method of claim 1, wherein the wireless device and the first satellite are operating in a Non-terrestrial Network, NTN.

15. A wireless device comprising:
   processing circuitry configured to:
   obtain a remaining service time (Tservice) associated with a first satellite or first spot beam;
   determine a time to access (Taccess) comprising an amount of time required to initiate a connection with the first satellite or the first spot beam;
   determine whether the remaining service time is greater than or equal to the time to access; and
   when the remaining service time is greater than or equal to the time to access, initiate the connection with the first satellite or first spot beam or when the remaining service time is not greater than or equal to the time to access initiate a connection with a second satellite or a second spot beam.

* * * * *